United States Patent
Noda et al.

(10) Patent No.: US 10,061,384 B2
(45) Date of Patent: Aug. 28, 2018

(54) INFORMATION PROCESSING APPARATUS, INFORMATION PROCESSING METHOD, AND PROGRAM

(71) Applicant: SONY CORPORATION, Tokyo (JP)

(72) Inventors: Takuro Noda, Tokyo (JP); Ryouhei Yasuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/548,945

(22) PCT Filed: Dec. 3, 2015

(86) PCT No.: PCT/JP2015/084066
§ 371 (c)(1),
(2) Date: Aug. 4, 2017

(87) PCT Pub. No.: WO2016/136074
PCT Pub. Date: Sep. 1, 2016

(65) Prior Publication Data
US 2018/0039327 A1 Feb. 8, 2018

(30) Foreign Application Priority Data
Feb. 23, 2015 (JP) .................................. 2015-032484

(51) Int. Cl.
*G06F 3/01* (2006.01)
*G03B 13/06* (2006.01)
*H04N 5/232* (2006.01)

(52) U.S. Cl.
CPC ............. *G06F 3/013* (2013.01); *G03B 13/06* (2013.01); *H04N 5/23222* (2013.01); *H04N 5/23219* (2013.01)

(58) Field of Classification Search
CPC .... G06F 3/013; G03B 13/06; H04N 5/23222; H04N 5/23219
See application file for complete search history.

(56) References Cited

U.S. PATENT DOCUMENTS

| 9,092,671 B2* | 7/2015 | Noda ................... A61B 5/1171 |
| 2012/0212623 A1* | 8/2012 | Cho ..................... G05D 1/0246 348/169 |

(Continued)

FOREIGN PATENT DOCUMENTS

| JP | 8-5955 A | 1/1996 |
| JP | 9-247564 A | 9/1997 |
| JP | 2011-17777 A | 1/2011 |

OTHER PUBLICATIONS

International Search Report and Written Opinion of PCT Application No. PCT/JP2015/084066, dated Feb. 2, 2016, 01 pages of English Translation and 05 pages of ISRWO.

*Primary Examiner* — Antoinette Spinks
(74) *Attorney, Agent, or Firm* — Chip Law Group

(57) ABSTRACT

An information processing apparatus includes an eyeball position estimation unit that estimates an eyeball position of a user in a pupil-corneal reflection method on the basis of a captured image including an eye of the user captured when the eye of the user looking at a display surface is irradiated with light; a discrepancy estimation unit that estimates an amount of discrepancy between an eyeball position on the display surface and a visual field center of the display surface, the eyeball position being identified on the basis of the eyeball position; and an operation instruction unit that issues an operation instruction to adjust a position of a device including the display surface on the basis of the estimated amount of discrepancy.

9 Claims, 16 Drawing Sheets

(56) References Cited

U.S. PATENT DOCUMENTS

2015/0009313 A1\* 1/2015 Noda ................... A61B 5/1171
348/78
2017/0090202 A1\* 3/2017 Tatsuta ............... G02B 27/0176

\* cited by examiner

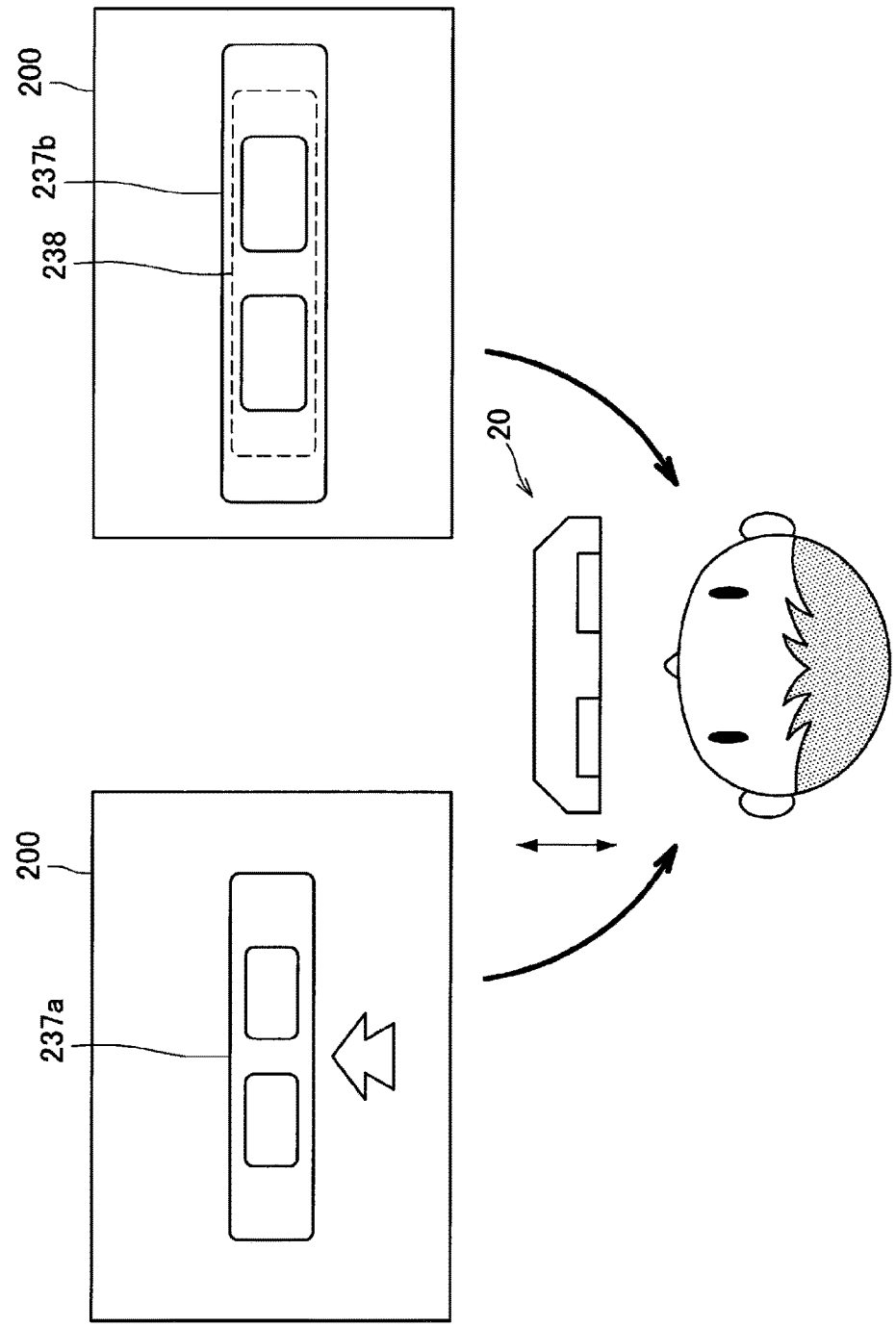

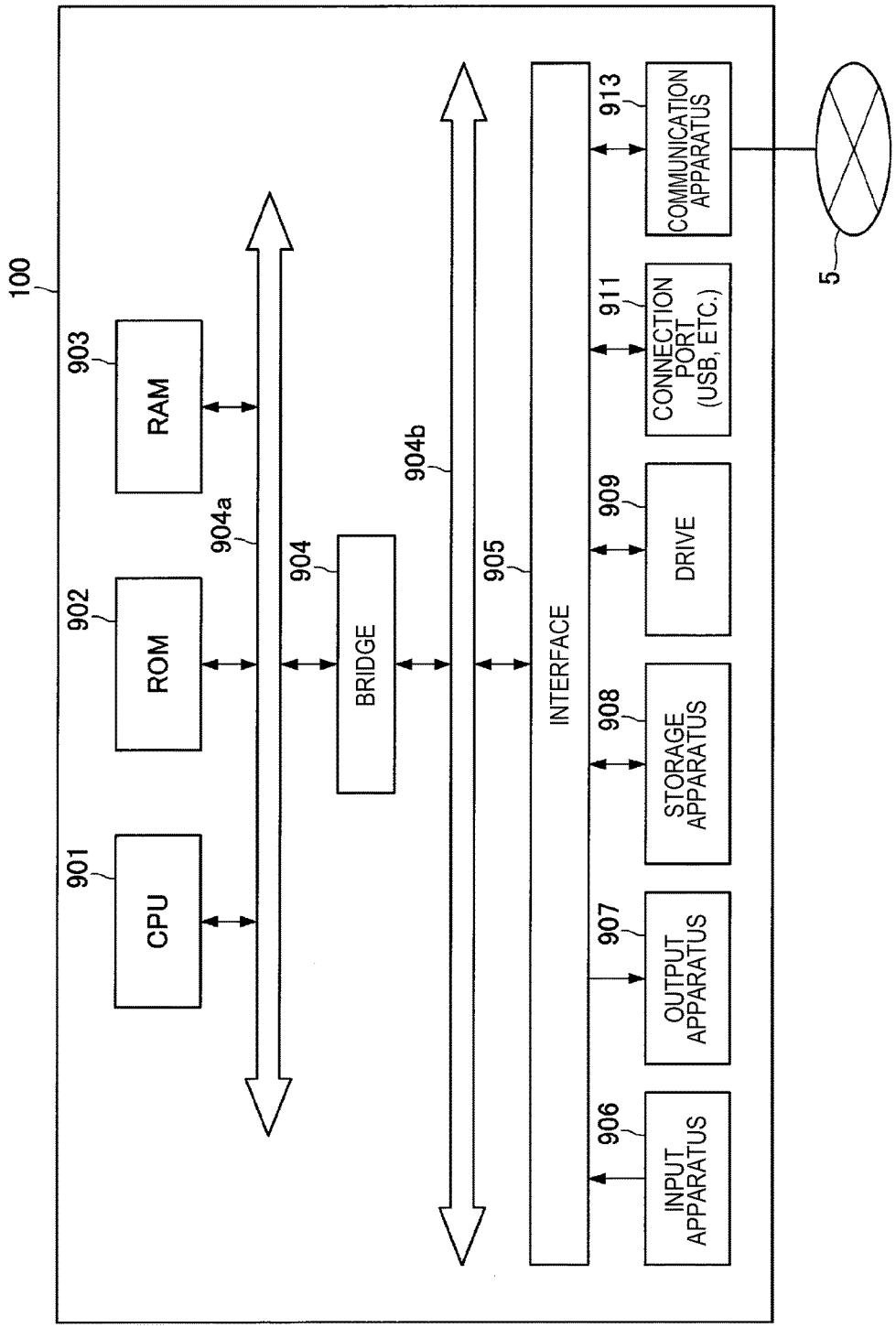

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2015/084066 filed on Dec. 3, 2015, which claims priority benefit of Japanese Patent Application No. JP 2015-032484 filed in the Japan Patent Office on Feb. 23, 2015. Each of the above-referenced applications is hereby incorporated herein by reference in its entirety.

TECHNICAL FIELD

The present disclosure relates to an information processing apparatus, an information processing method, and a program.

BACKGROUND ART

There is disclosed technology that detects a user's gaze with respect to a display surface displaying a variety of content, and utilizes the detected gaze for various types of operations. For example, Patent Literature 1 discloses an imaging apparatus that radiates light in the infrared band (infrared light) onto the eyeball of a user peering into a view finder, and detects the user's gaze with respect to a display surface displaying a through-the-lens image by capturing the reflected light from the eyeball with a detector, and also utilizes the detected gaze for autofocus (AF).

Recently, the development of wearable terminals such as head-mounted displays and eyeglasses-style terminals has been advancing rapidly. Such technology that detects the user's gaze is also important in a wearable terminal worn by the user to view a display, and the detected gaze is used as terminal operation information, or used as autofocus information, for example.

CITATION LIST

Patent Literature

Patent Literature 1: JP H5-333259A

DISCLOSURE OF INVENTION

Technical Problem

However, if a user's eyeball position is divergent from an optical axis extending from the visual field center of a display surface of a device such as an imaging apparatus and a wearable terminal, the user is unable to clearly look at an image displayed on the display surface. Further, it is not possible to accurately detect the user's line of sight.

The present disclosure then proposes a novel and improved information processing apparatus, information processing method, and program that can adjust the position of a device to locate a user's eyeball position on an optical axis extending from the visual field center of a display surface.

Solution to Problem

According to the present disclosure, there is provided an information processing apparatus including: an eyeball position estimation unit configured to estimate an eyeball position of a user in a pupil-corneal reflection method on the basis of a captured image including an eye of the user captured when the eye of the user looking at a display surface is irradiated with light; a discrepancy estimation unit configured to estimate an amount of discrepancy between an eyeball position on the display surface and a visual field center of the display surface, the eyeball position being identified on the basis of the eyeball position; and an operation instruction unit configured to issue an operation instruction to adjust a position of a device including the display surface on the basis of the estimated amount of discrepancy.

Further, according to the present disclosure, there is provided an information processing method including, by an information processing apparatus: estimating an eyeball position of a user in a pupil-corneal reflection method on the basis of a captured image including an eye of the user captured when the eye of the user looking at a display surface is irradiated with light; estimating an amount of discrepancy between an eyeball position on the display surface and a visual field center of the display surface, the eyeball position being identified on the basis of the eyeball position; and issuing an operation instruction to adjust a position of a device including the display surface on the basis of the estimated amount of discrepancy.

Moreover, according to the present disclosure, there is provided a program for causing a computer to function as: an eyeball position estimation unit configured to estimate an eyeball position of a user in a pupil-corneal reflection method on the basis of a captured image including an eye of the user captured when the eye of the user looking at a display surface is irradiated with light; a discrepancy estimation unit configured to estimate an amount of discrepancy between an eyeball position on the display surface and a visual field center of the display surface, the eyeball position being identified on the basis of the eyeball position; and an operation instruction unit configured to issue an operation instruction to adjust a position of a device including the display surface on the basis of the estimated amount of discrepancy.

Advantageous Effects of Invention

As described above, according to the present disclosure, it is possible to adjust the position of a device to locate a user's eyeball position on the visual field center of a display surface. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is an explanatory diagram illustrating an example of an operation instruction object that moves the wearable terminal back and forth.

FIG. 16 is a hardware configuration diagram illustrating a hardware configuration of an information processing apparatus according to the embodiment

MODE(S) FOR CARRYING OUT THE INVENTION

Figure 1:
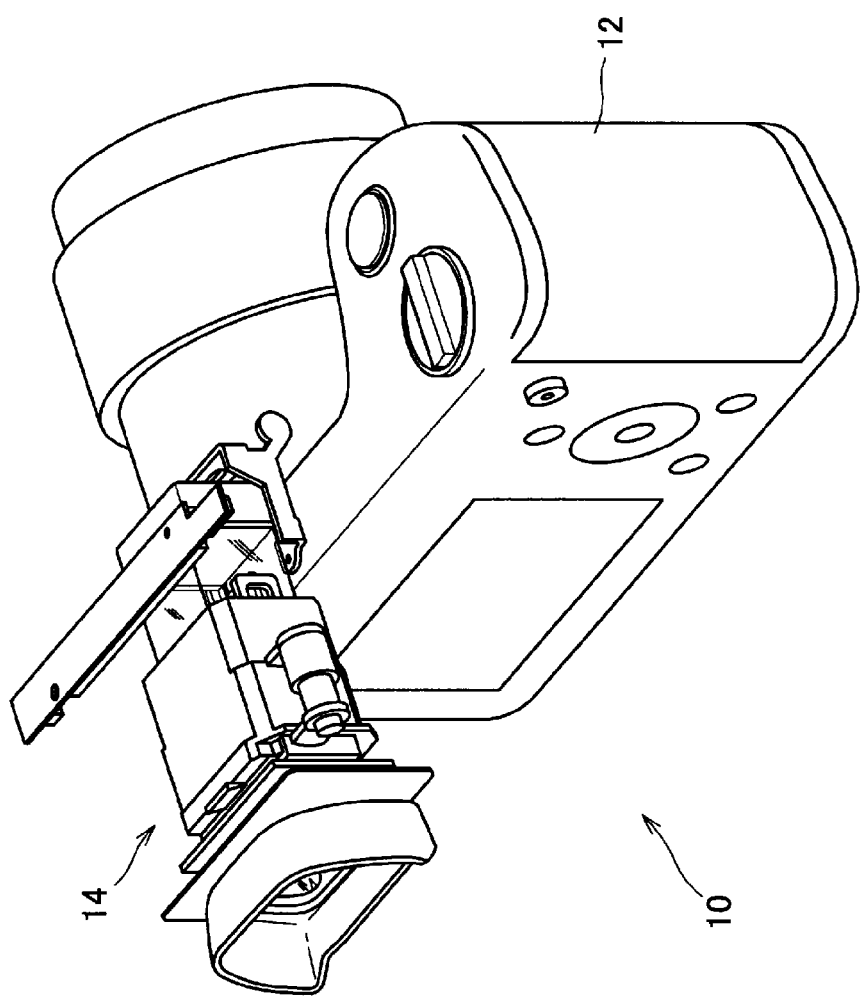
FIG. 1 is a schematic perspective view illustrating an example of an imaging system including an imaging apparatus connected to an electronic view finder.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.
1. First embodiment (application to EVF)
1.1. Apparatus configuration of device
1.2. Functional configuration
1.3. Operation instruction process for resolving discrepancy of eyeball position
2. Second embodiment (application to wearable terminal)
2.1. Apparatus configuration of device
2.2. Operation instruction process for resolving discrepancy of eyeball position
2.3. Variation of operation instruction object
3. Hardware configuration An information processing apparatus according to an embodiment of the present disclosure is applied to a device including a display unit and a line-of-sight detection apparatus that detects the line of sight of a user who is looking at a display surface of the display unit. For example, the information processing apparatus is applied to an imaging apparatus connected to an electronic view finder, a head-mounted display, a glasses-type wearable terminal, or the like. The information processing apparatus adjusts an eyeball position on the display surface of each device.

The information processing apparatus determines whether a user's eyeball position is located at the visual field center of the display surface of the device. In a case where the user's eyeball position is divergent from the visual field center of the display surface, the information processing apparatus imparts to the user an operation instruction to move the device to solve this discrepancy. The user moves the device on the basis of the operation instruction of which the user is notified, and positions the eyeball at the visual field center of the display surface.

Matching the user's eyeball position with the visual field center of the display surface can improve the line-of-sight detection accuracy of a line-of-sight detection apparatus, and allow the user to more clearly look at an image displayed on the display unit. Further, in a case it is possible to operate the device on the basis of the line of sight, the higher line-of-sight detection accuracy can decrease the discrepancy between the actual line-of-sight direction and the detected line-of-sight direction and accurately execute an operation intended by the user.

The following describes the configuration of the information processing apparatus, and an operation instruction imparted by the information processing apparatus to a user in detail.

<1. First Embodiment>
[1.1. Apparatus Configuration of Device]

Figure 2:
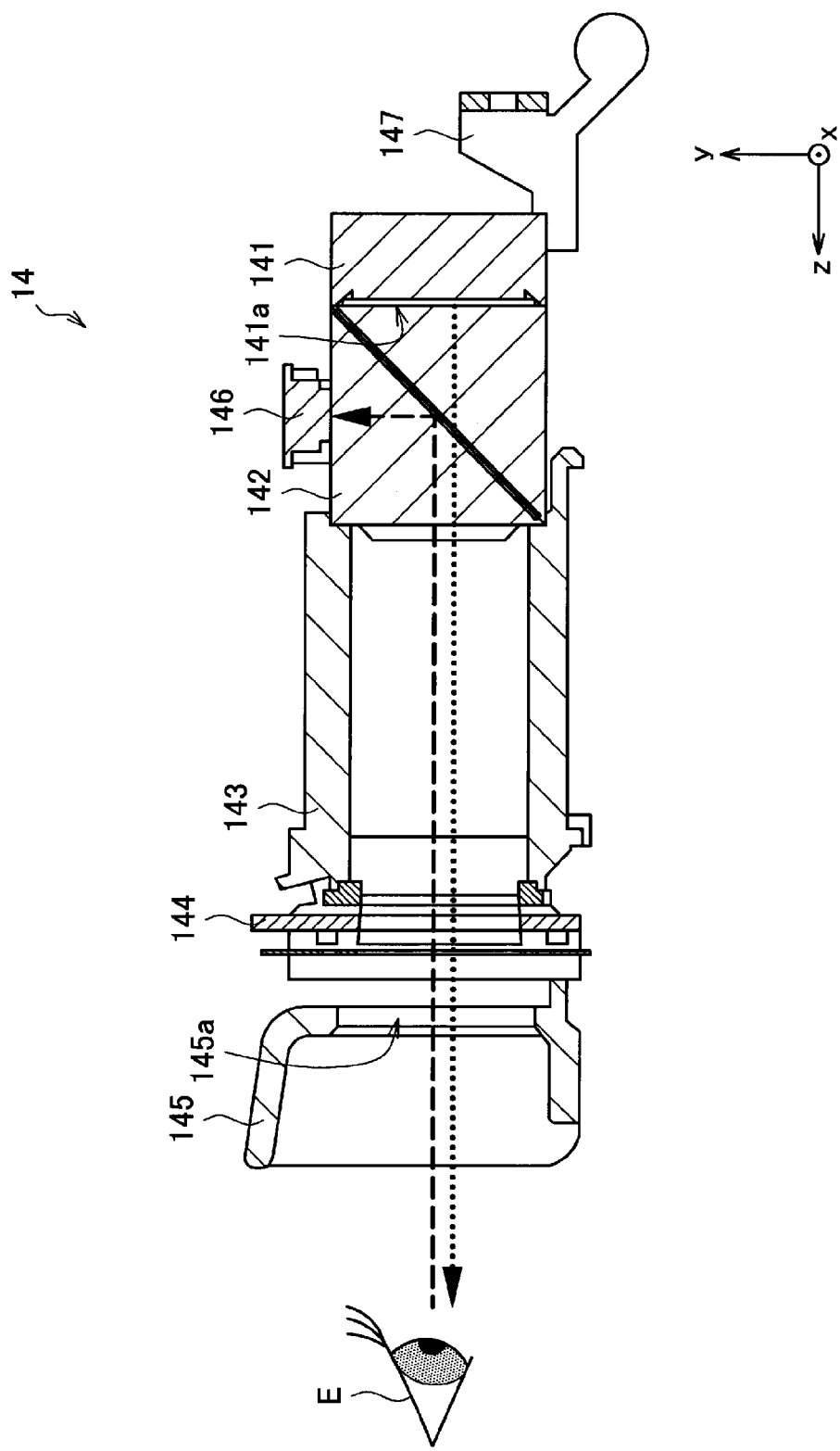
FIG. 2 is a schematic cross-sectional view taken along a yz plane, and illustrating a configuration example of the electronic view finder.
Figure 3:
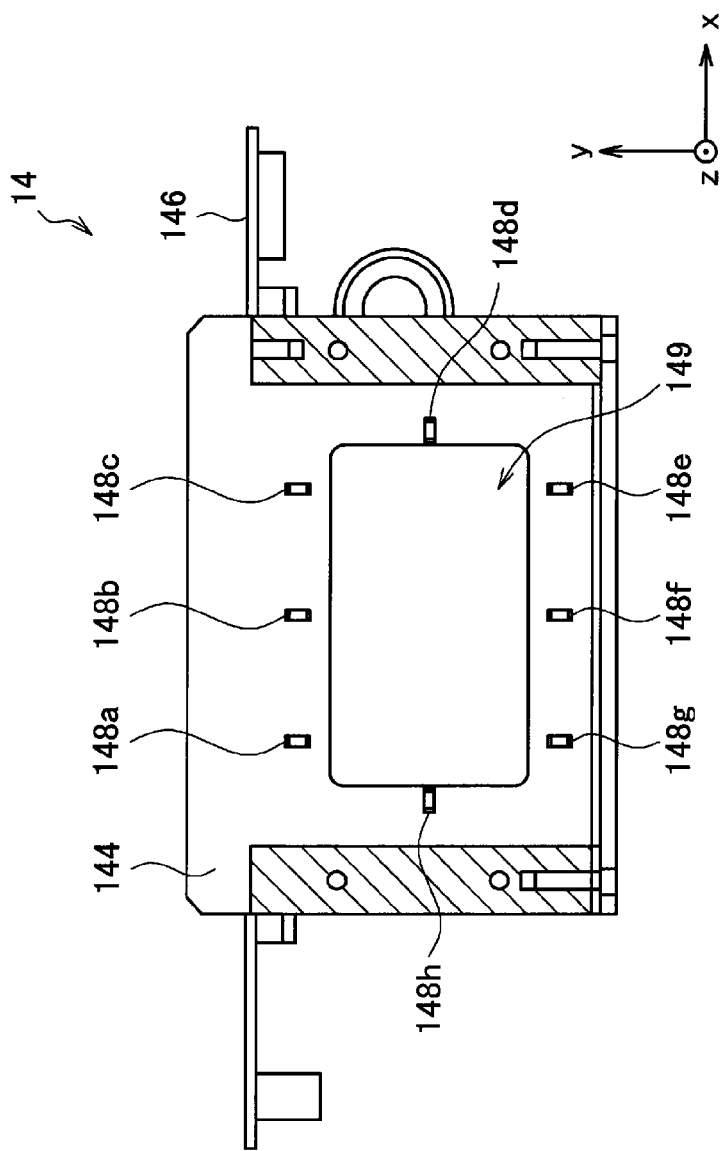
FIG. 3 is a schematic cross-sectional view taken along an xy plane, and illustrating a configuration example of a light source board of the electronic view finder.

First, a case will be described as a first embodiment of the present disclosure with reference to FIGS. 1 to 3 where the information processing apparatus according to the present disclosure is applied to an imaging apparatus connected to an electronic view finder (which will be referred to as "EVF"). FIG. 1 is a schematic perspective view illustrating an example of an imaging system 10 including an imaging apparatus 12 connected to an electronic view finder 14. FIG. 2 is a schematic cross-sectional view taken along a yz plane, and illustrating a configuration example of the EVF 14. FIG. 3 is a schematic cross-sectional view taken along an xy plane, and illustrating a configuration example of a light source board 144. Additionally, the upstream position with respect to the positive direction of the z axis will also be described as "upstream stage" to represent the positional relationship between components, while the downstream position will also be referred to as "downstream stage."

The information processing apparatus according to the present embodiment is applied to the imaging system 10 including the imaging apparatus 12 and the EVF 14 electrically connected to the imaging apparatus 12, for example, as illustrated in FIG. 1. The EVF 14 causes a display unit 141 to display image data obtained by an image sensor such as a CCD converting light entering through the lens of the imaging apparatus 12. A user looks into an eyecup 145 of the EVF 14, and adjusts an imaging condition such as the angle for showing an imaging target, the magnification, the exposure, and the focus as appropriate while observing a through-the-lens image displayed on a display surface 141a of the display unit 141. This allows the user to acquire a desired captured image.

More specifically, the EVF 14 includes the display unit 141, an optical path changing element 142, a loupe unit 143, the light source board 144, the eyecup 145, an imaging unit 146, and a hinge 147 as illustrated in FIGS. 2 and 3. As illustrated in FIG. 2, the display unit 141, the optical path changing element 142, the loupe unit 143, the light source board 144, and the eyecup 145 of these components are arranged in a row in this order. The EVF 14 is mounted on the imaging apparatus 12 with the eyecup 145 positioned on the user's side.

The display unit 141 is a display apparatus that displays information. The display unit 141 includes, for example, an organic electro-luminescence display (OELD) apparatus, a LED display apparatus, a liquid crystal display apparatus, or the like. The display unit 141 displays, for example, a captured image taken by the imaging apparatus 12 as a through-the-lens image. A user can check the capture range of the imaging apparatus 12, the currently set imaging condition, and the like while looking at a through-the-lens image displayed on the display surface 141a of the display unit 141.

The optical path changing element 142 is an optical member disposed to face the display surface 141a of the display unit 141, and linearly transmits incident light from one direction and reflects light (or part of light) from another direction in a predetermined direction. For example, a beam splitter can be used as the optical path changing element 142. The optical path changing element 142 linearly transmits light entering through the display surface 141a of the display unit 141, and emits the light to a user's eye E as illustrated in FIG. 2. Further, the optical path changing element 142 reflects the reflected light of the light radiated to the user's eye E to detect the user's line of sight, and guides the reflected light to the imaging unit 146.

The loupe unit 143 is an optical member disposed in the downstream stage of the optical path changing element 142, and magnifies information displayed on the display surface 141a of the display unit 141. For example, a lens system including at least one type of lens may be used as the loupe unit 143.

The light source board 144 is a member disposed in the downstream stage of the loupe unit 143, and includes an element for detecting the user's line of sight. The plane on the downstream stage side of the light source board 144 has an opening 149 substantially at the center as illustrated in FIG. 3, and includes light sources 148 (148a to 148h) around the opening 149. The opening 149 is formed to allow a user to observe display information on the display unit 141 provided on the upstream stage side of the light source board 144 when the user looks into the eyecup 145. The light sources 148 (148a to 148h) irradiate the eye E of the user looking into the eyecup 145 with light. For example, LEDs that emit light in wavelength bands (such as the infrared bands) other than visible light bands may be used as the light sources 148 (148a to 148h). If light sources that emit light other than light in visible light bands are used, a user is not interrupted by even light radiated to the user's eyeball from the light sources in observing the display surface 141a of the display unit 141.

As illustrated in FIG. 3, the light sources 148 (148a to 148h) are disposed in a manner that a user's eyeball can be irradiated with light from up-down and left-right directions in the present embodiment. Specifically, as the light sources 148 (148a to 148h), LEDs 148a to 148c are disposed at the positions corresponding to the upper side of the opening 149, and an LED 148d is disposed at the position corresponding to the right side of the opening 149. Further, LEDs 148e to 148g are disposed at the positions corresponding to the lower side of the opening 149, and an LED 148h is disposed at the position corresponding to the left side of the opening 149.

The light sources 148 (148a to 148h) disposed around the substantially quadrangular opening 149 are driven by a control circuit (not illustrated). The control circuit is connected to a controller (not illustrated) that transmits and receives signals between the EVF 14 and the imaging apparatus 12. The control circuit, which receives a line-of-sight detection instruction from the controller, controls the light emitting of the light sources 148 in accordance with the instruction. Additionally, the controller is also connected to the imaging unit 146 described below, and also outputs an imaging instruction to the imaging unit 146 when outputting a line-of-sight detection instruction to the control circuit. This makes it possible to acquire an image of a user's eye E with the light sources 148 emitting light.

The eyecup 145 is a member that is disposed in the downstream stage of the light source board 144. A user looks into the eyecup 145 and an eye of the user comes into contact with the eyecup 145 when the user observes the display surface 141a of the display unit 141. The eyecup 145 has an opening 145a that is open in the optical axis direction (z direction). A user can observe the display surface 141a of the display unit 141 through the opening 145a of the eyecup 145. Further, the light emitted from the light sources 148 provided on the light source board 144 is radiated to the user's eye E via the opening 145a of the eyecup 145.

The imaging unit 146 acquires an image based on the reflected light of the light (reflected light) by a user's eye E which is emitted from the light sources 148. The imaging unit 146 is an image sensor such as a charge-coupled device (CCD) image sensor or a complementary MOS (CMOS) image sensor. The imaging unit 146 acquires the image (captured image) corresponding to light incident on a light receiving surface on the basis of a signal having the strength corresponding to the amount of light received for each pixel included in the light receiving surface. The imaging unit 146 is disposed at a position at which the reflected light whose traveling direction is changed by the optical path changing element 142 can be received in the present embodiment. The imaging unit 146 receives the reflected light of the light by a user's eye E which is emitted from the light sources 148, thereby acquiring a captured image of the user's eye E. The user's line-of-sight direction and eyeball position are detected on the basis of this captured image.

The hinge 147 is a connection member for connecting the imaging apparatus 12 to the EVF 14. The hinge 147 may be, for example, a known coupling mechanism member for physically connecting the housing of the imaging apparatus 12 to the housing of the EVF 14. If the hinge 147 connects the imaging apparatus 12 to the EVF 14 as illustrated in FIG. 1, a user can use the EVF 14 in a similar way in which the finder mounted on the imaging apparatus 12 is used.

[1.2. Functional Configuration]

Next, the functional configuration of the information processing apparatus according to the present embodiment will be described on the basis of FIG. 4. Additionally, FIG. 4 is a functional block diagram illustrating the functional configuration of an information processing unit 140 that is the information processing apparatus according to the present embodiment.

The information processing unit 140 according to the present embodiment is a processing unit that determines whether the eyeball position of the eye E of a user looking into the EVF 14 fixed to the imaging apparatus 12 is located at the visual field center of the display surface 141a. The information processing unit 140 is included in the EVF 14, for example, as illustrated in FIG. 4. Additionally, the information processing unit 140 may be provided to an apparatus other than the EVF 14. For example, the information processing unit 140 may be provided to the controller (not illustrated) that connects the imaging apparatus 12 to the EVF 14, a server (not illustrated) that is connected to the EVF 14 in a manner that signals can be transmitted and received, or the like.

Figure 4:
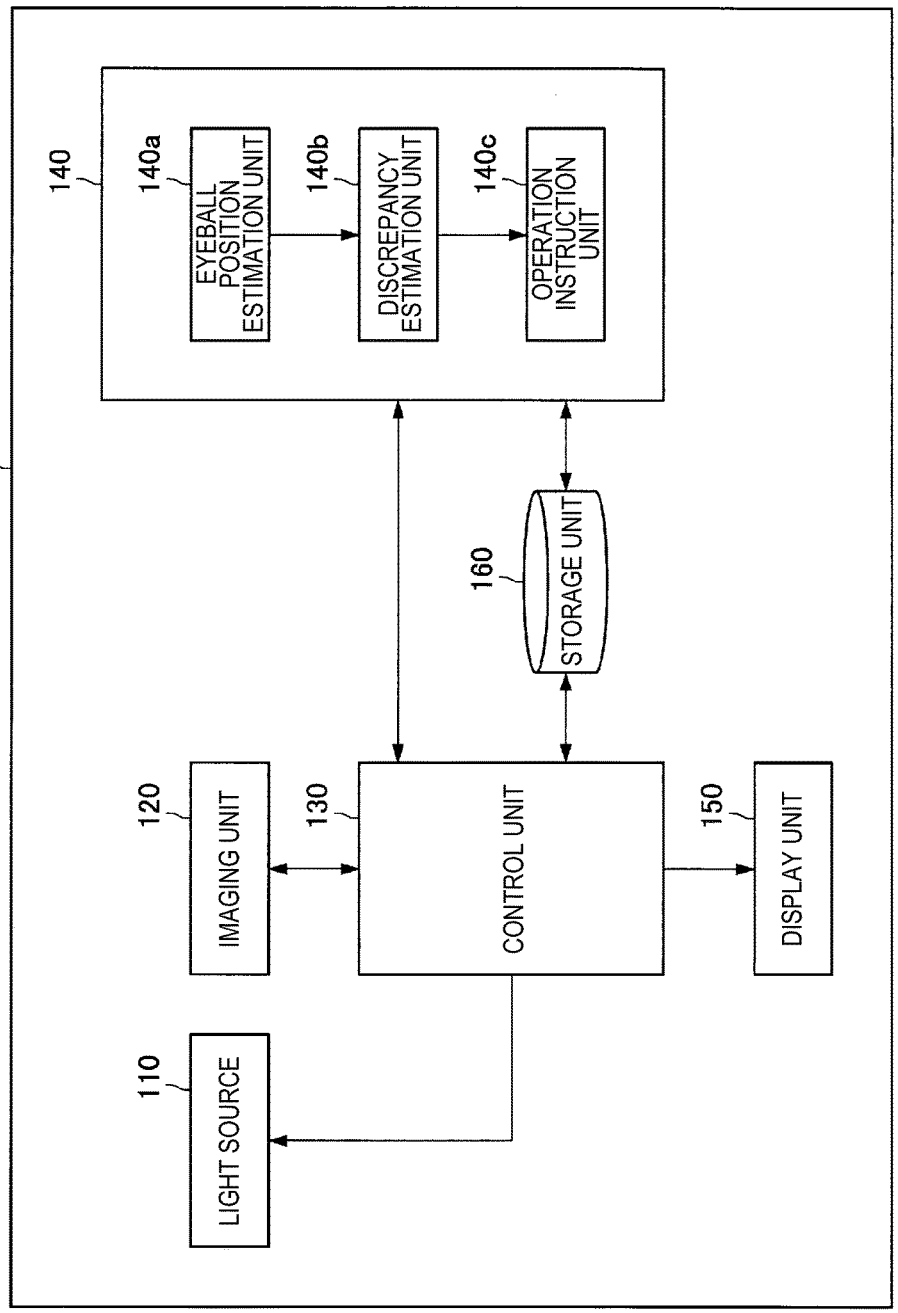
FIG. 4 is a functional block diagram illustrating a functional configuration of an information processing unit that is an information processing apparatus according to the embodiment.

The EVF 14 according to the present embodiment includes a light source 110, an imaging unit 120, a control unit 130, an information processing unit 140, a display unit 150, and a storage unit 160 as illustrated in FIG. 4. Additionally, the light source 110 corresponds to the light sources 148 (148a to 148h) in FIG. 3, and the imaging unit 120 corresponds to the imaging unit 146 in FIGS. 2 and 3. Further, the control unit 130 corresponds to the control circuit (not illustrated) that controls the light emitting of the light sources 148 and the controller (not illustrated) that controls the imaging unit 146, and the display unit 150 corresponds to the display unit 141 in FIG. 2. These functions will not be thus described in detail.

The information processing unit 140 is the information processing apparatus according to the present embodiment. The information processing unit 140 determines whether a user's eyeball position is located at the visual field center of the display surface of the device. In a case where the user's eyeball position is divergent from the visual field center of the display surface, the information processing apparatus imparts to the user an operation instruction to move the device to solve this discrepancy. Specifically, the information processing unit 140 includes an eyeball position estimation unit 140a, a discrepancy estimation unit 140b, and an operation instruction unit 140c.

The eyeball position estimation unit 140a estimates the position of the eye E of a user looking at the display unit 150. The eyeball position estimation unit 140a estimates the user's line-of-sight direction (optical axis vector) and eyeball position on the basis of a captured image of the user's eye E which is acquired by detecting the reflected light of the light radiated to the eye of the user looking into the eyecup 145 of the EVF 14 from the light sources 148. The user's line-of-sight direction is estimated, for example, using a pupil-corneal reflection method. Additionally, a process of estimating the line-of-sight direction using the pupil-corneal reflection method will be described below. The eyeball position estimation unit 140a outputs information on the user's estimated eyeball position to the discrepancy estimation unit 140b.

The discrepancy estimation unit 140b estimates the amount of the discrepancy between the estimated position of the user's eyeball on the display surface by the eyeball position estimation unit 140a and the visual field center of the display surface of the display unit 150. The discrepancy estimation unit 140b determines whether the visual field center of the display surface of the display unit 150 which is set in advance is located in the user's estimated line-of-sight direction. The difference between the eyeball position on the display surface and the visual field center of the display surface may be then obtained as the amount of discrepancy. The discrepancy estimation unit 140b outputs a determination result indicating the presence or absence of discrepancy and the amount of discrepancy to the operation instruction unit 140c.

The operation instruction unit 140c imparts to the user an operation instruction to move the device and make a fine adjustment for resolving discrepancy on the basis of an estimation result from the discrepancy estimation unit 140b. The operation instruction unit 140c issues an instruction, for example, to move the device up and down, right and left, or back and forth for solving the discrepancy between the eyeball position on the display surface and the visual field center of the display surface. An operation instruction is issued, for example, by displaying the content of the operation instruction on the display unit 150. A specific example of the content of an operation instruction from the operation instruction unit 140c will be described below. The operation instruction unit 140c outputs a decided operation instruction to the control unit 130, and causes the display unit 150 to display the decided operation instruction.

The storage unit 160 stores information necessary to conduct a variety of processes in the EVF 14. The storage unit 160 stores, for example, the visual field center of the display surface of the display unit 150, information for imparting an operation instruction to a user, or the like.

The functional configuration of the EVF 14 according to the present embodiment has been described above.

[1.3. Operation Instruction Process for Resolving Discrepancy of Line-of-Sight Direction]

The EVF 14 according to the present embodiment can improve a user's line-of-sight detection accuracy by matching the user's eyeball position with the visual field center of the display surface, and the user can more clearly look at an image displayed on the display unit. In a case where the above-described information processing unit 140 determines that the eyeball position does not match the visual field center of the display surface, the EVF 14 according to the present embodiment notifies the user of an operation instruction to match the eyeball position with the visual field center of the display surface. The user can easily resolve this discrepancy by operating the device in accordance with this operation instruction, and can more clearly look at information displayed on the display unit 141.

Figure 5:
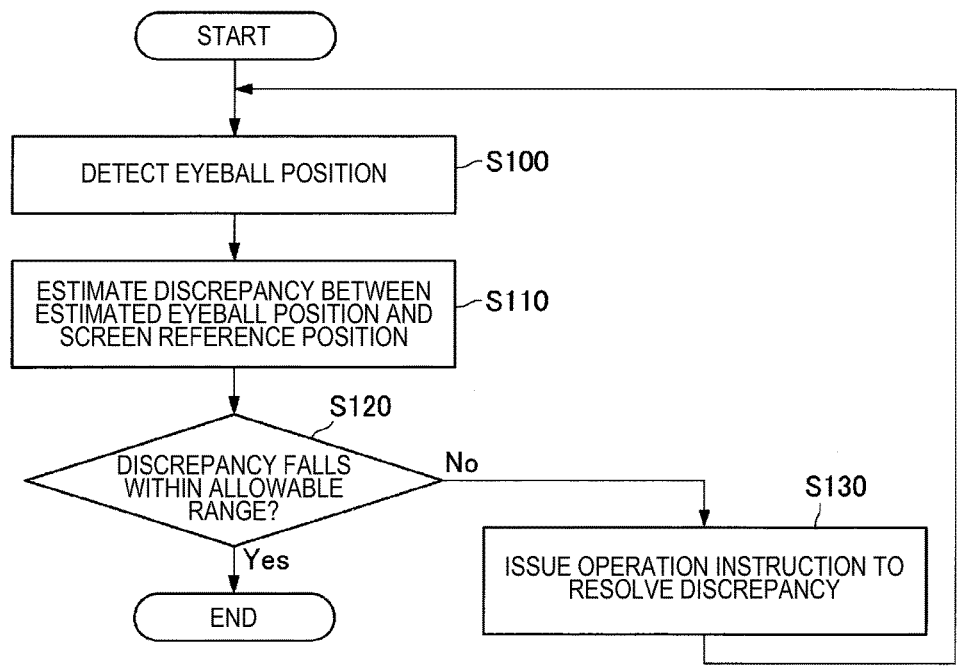
FIG. 5 is a flowchart illustrating an operation instruction process conducted by the information processing unit according to the embodiment.
Figure 6:
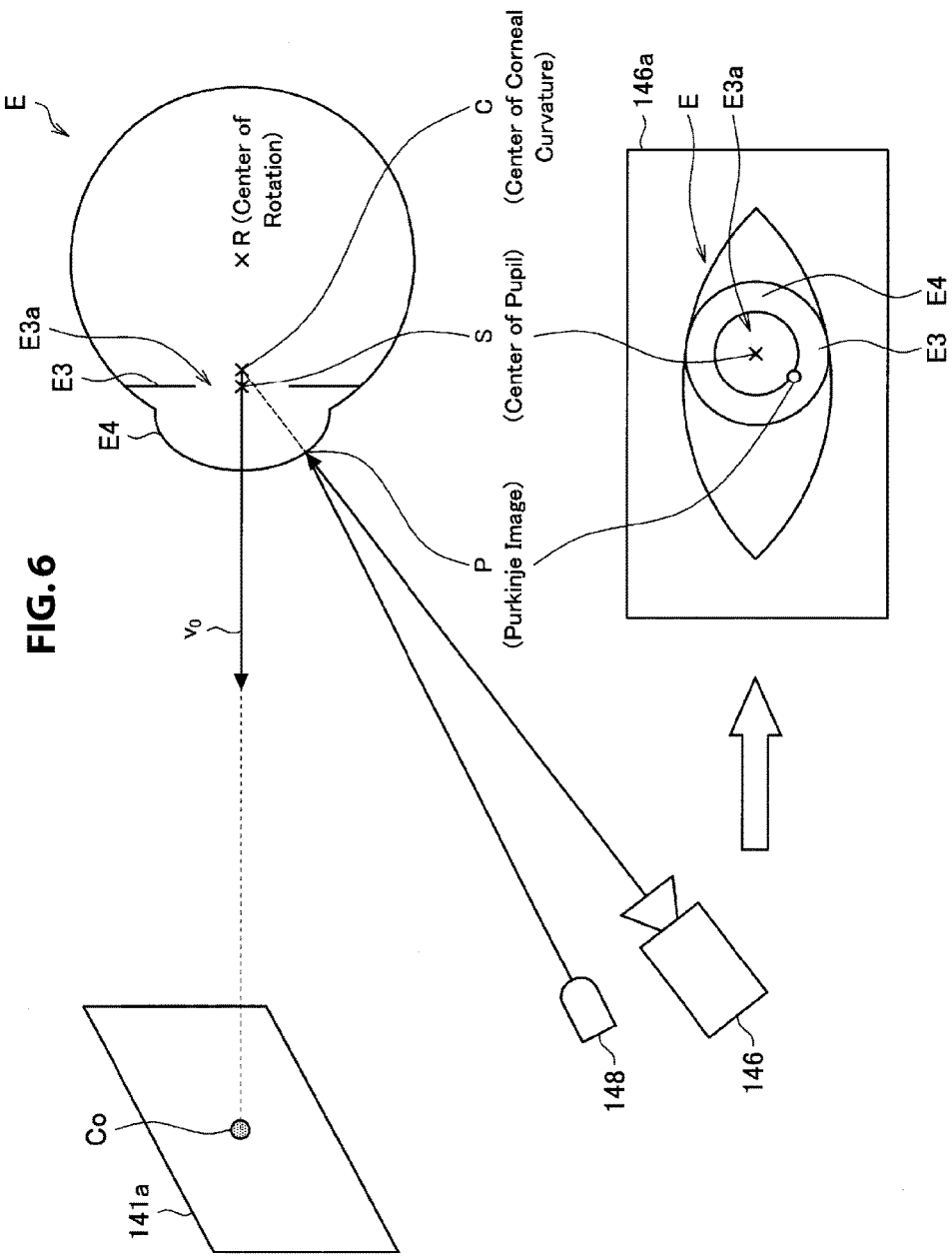
FIG. 6 is an explanatory diagram for describing a process of computing an optical axis vector using a pupil-corneal reflection method.
Figure 7:
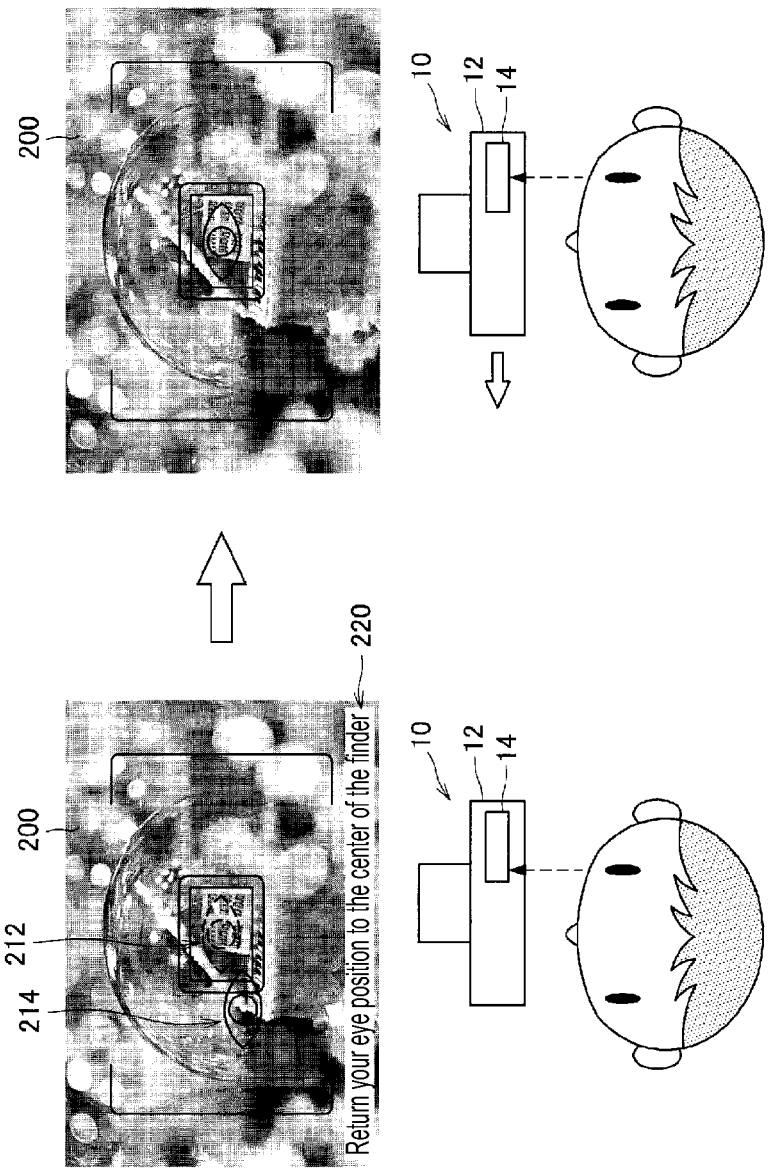
FIG. 7 is an explanatory diagram illustrating an example of an operation instruction from an operation instruction unit according to the embodiment.

The following describes an operation instruction process conducted by the information processing unit 140 according to the present embodiment on the basis of FIGS. 5 to 7. Additionally, FIG. 5 is a flowchart illustrating an operation instruction process conducted by the information processing unit 140 according to the present embodiment. FIG. 6 is an explanatory diagram for describing a process of computing an optical axis vector and an eyeball position using the pupil-corneal reflection method. FIG. 7 is an explanatory diagram illustrating an example of an operation instruction from the operation instruction unit 140c according to the embodiment.

An operation instruction process for the device issued by the information processing unit 140 according to the present embodiment is constantly executed, for example, while the EVF 14 is functioning. If the operation instruction process is constantly executed in this way, it is possibly to notify a user of an operation instruction to resolve the discrepancy as soon as the user's eyeball position is divergent from the visual field center of the display surface.

(1) Line-of-Sight Position Detection (S100)

The information processing unit 140 first detects the line-of-sight position of the eye E of a user looking into the eyecup 145 on the display surface of the display unit 150 using the eyeball position estimation unit 140a as illustrated in FIG. 5 (S100). The eyeball position estimation unit 140a uses, for example, the pupil-corneal reflection method to detect the optical axis that is the line-of-sight direction and the eyeball position.

A process of estimating the optical axis using the pupil-corneal reflection method will now be described on the basis of FIG. 6. In the pupil-corneal reflection method, light from a light source 141 is radiated onto the eyeball E of the user observing the display surface 141a of the display unit, and the eye 10 irradiated with the light is imaged by an imaging unit 146. Subsequently, the optical axis is estimated on the basis of a captured image 146a captured by the imaging unit 146. For the sake of simplicity, the case of irradiating the eyeball E with one light source 148 will be described herein.

It is assumed that the user faces the display surface 141a head on as illustrated in FIG. 6 in a manner that the user looks at a visual field center $C_0$ of the display surface 141a. At this point, the eyeball E is irradiated with light from the light source 148, and the eyeball E is imaged by the imaging unit 146. As illustrated in FIG. 6, the acquired captured image 146a of the eyeball E depicts a cornea E4, an iris E3, and a pupil E3 of the user's eyeball E. The captured image 146a also depicts a Purkinje image P, which is a bright point of irradiating light with which the eyeball E is irradiated from the light source 148.

After the captured image 146a is acquired, a process of computing the optical axis is conducted. The eyeball position estimation unit 140a conducts a process of computing the optical axis. For this reason, first, a center S of the pupil and the Purkinje image P are detected from the captured image 146a. These detection processes can be conducted by known image recognition technology.

For example, in the process of detecting the image of the pupil E3a, various types of image processing with respect to the captured image 146a (for example, processing to adjust factors such as distortion, black level, and white balance), a process of acquiring a luminance distribution inside the captured image 146a, and the like are conducted. Also, on the basis of the acquired luminance distribution, a process of detecting an edge in the image of the pupil E3a, a process of approximating the detected edge in the image of the pupil E3a with a figure such as a circle or an ellipse, and the like may be conducted. From the detected image of the pupil E3a, the center S of the pupil may be computed.

Additionally, in the process of detecting the Purkinje image P, a series of processes, such as the various types of image processing with respect to the captured image 146a, the process of acquiring a luminance distribution inside the captured image 146a, and a process of detecting pixels where the difference in the luminance value is comparatively larger than the surrounding pixels on the basis of the luminance distribution, may also be conducted. Also, the center of the Purkinje image P may be detected from the detected Purkinje image P.

Next, three-dimensional coordinates of the center S of the pupil and a center C of the curvature of the cornea E4 are computed. In a case where the cornea E4 is taken to be part of a sphere, the center C of the curvature of the cornea E4 is the center of the sphere. The three-dimensional coordinates of the center S of the pupil are computed on the basis of the image of the pupil E3a detected from the captured image 146a. Specifically, the three-dimensional coordinates of each point on the edge of the pupil E3a in the captured image E3a are computed on the basis of properties such as the positional relationship between the imaging unit 146 and the eyeball E, the refraction of light at the surface of the cornea E4, and the distance between the center C of the curvature of the cornea E4 and the center S of the pupil. The center point of these coordinates is taken to be the three-dimensional coordinates of the center S of the pupil.

In addition, the center C of the curvature of the cornea E4 is computed on the basis of the Purkinje image P and the center thereof detected from the captured image E3a. Specifically, on a straight line joining the imaging unit 146 and the center of the Purkinje image P, the position advanced from the surface of the cornea E4 inward into the eyeball E by the curvature radius of the cornea E4 is computed as the three-dimensional coordinates of the center C of the curvature of the cornea E4, on the basis of properties such as the positional relationship between the light source 148, the imaging unit 146, and the eyeball E, and the curvature radius of the cornea E4.

The straight line joining the center C of the curvature of the cornea E4 computed in this way and the center S of the pupil becomes the estimated optical axis. In other words, the coordinates of the position at which the optical axis and the display surface 141a intersect become the estimated gaze position of the user. Note that a vector proceeding from the center C of the curvature of the cornea E4 to the center S of the pupil is designated as an optical axis vector vo. This optical axis vector vo serves as the direction of the user's line of sight. Further, a center R of rotation is located at the position from the center C of the curvature in the opposite direction to vo. Statistics may be used for the distance to the center R of rotation, or the center R of rotation may be obtained from the intersections of the optical axis vectors vo for the respective points. This makes it possible to identify the eyeball position on the display surface 141a of the display unit.

(2) Estimation of Amount of Discrepancy (S110)

Once the eyeball position estimation unit 140a identifies a user's eyeball position, the discrepancy estimation unit 140b estimates the discrepancy between the user's estimated eyeball position and a screen reference position (S110). The screen reference position is a position on the display surface to which the user's line of sight is desired to point, and the visual field center $C_0$ of the display surface 141a serves as the screen reference position in the present embodiment. The screen reference position is set in advance, and stored, for example, in the storage unit 160. The discrepancy estimation unit 140b obtains the coordinate difference between the user's eyeball position on the display surface 141a and the visual field center $C_0$ of the display surface 141a, and then can obtain the amount of the discrepancy therebetween.

(3) Determination about Whether Operation is Necessary (S120)

Once the discrepancy between the user's eyeball position estimated in step S110 and the visual field center $C_0$ of the display surface 141a is obtained, the discrepancy estimation unit 140b determines whether the amount of the discrepancy falls within an allowable range (S120). The allowable range of the amount of discrepancy is decided, for example, in accordance with whether the line-of-sight detection accuracy based on a captured image taken by the imaging unit 146 falls within an allowable range, or whether the display unit can be optically observed with no distortion, and the allowable range of the amount of discrepancy is stored in the storage unit 160 in advance. The discrepancy estimation unit 140b refers to the storage unit 160, and determines whether the amount of discrepancy obtained in step S110 falls within the allowable range. In a case where the discrepancy falls within the allowable range, there is no need to adjust the position of the device. Accordingly, the processes illustrated in FIG. 5 ends. If the EVF 14 is activated, the execution of the processes in FIG. 5 is started again.

(4) Operation Instruction for Device (S130)

Meanwhile, in a case where it is determined in step S120 that the discrepancy does not fall within the allowable range, the user's eyeball is divergent from the visual field center $C_0$ of the display surface 141a. Accordingly, the operation instruction unit 140c notifies the user of an operation instruction to resolve the discrepancy (S130).

FIG. 7 illustrates an example of operation instruction information of which a user is notified when the user's line of sight is divergent from the visual field center $C_0$ of the display surface 141a. It is assumed that a through-the-lens image 200 is displayed on the display surface 141a of the EVF 14 as illustrated in the left part of FIG. 7. Here, if the eyeball position agrees with the visual field center $C_0$ of the display surface 141a when the user faces the front, the user can clearly look at this through-the-lens image 200. However, when the eyeball position does not match the visual field center $C_0$ of the display surface 141a, it is not possible to clearly look at the through-the-lens image 200. In such a case, the operation instruction unit 140c displays an object for imparting an operation instruction to a user as illustrated in the left part of FIG. 7.

For example, the operation instruction unit 140c displays a target object 212 and an eyeball position object 214 as operation instruction information. The target object 212 represents the visual field center $C_0$ of the display surface 141a, which serves as a position that a user's eyeball position is desired to match. The eyeball position object 214 represents the user's current eyeball position. The target object 212 and the eyeball position object 214 may have the form of the eye, for example, as illustrated in FIG. 7, or other forms such as circles, quadrangles, and stars. Once the target object 212 and the eyeball position object 214 are displayed, the user recognizes that the eyeball position is divergent when the user faces the front and moves the EVF 14 to match the target object 212 with the eyeball position object 214. A message object 220 saying "Return your eye position to the center of the finder" may be then superimposed as an operation instruction to a user on the through-the-lens image 200 as illustrated in the left part of FIG. 7.

Receiving the operation instructions via these objects (the target object 212, the eyeball position object 214, and the message object 220), a user moves the EVF 14 up and down, right and left, and back and forth. For example, when the eyeball position object 214 is off to the left from the target object 212 as illustrated in the part of FIG. 7, a user moves the EVF 14 to the left to make the target object 212 agree with the eyeball position object 214. If the processes in steps S100 to S120 are then repeated, and the display position of the eyeball position object 214 is also changed with the movement of the EVF 14, the user can recognize whether the user is moving the device in the correct direction.

When the target object 212 agrees with the eyeball position object 214, the line of sight is pointing to the of visual field center $C_0$ of the display surface 141a. Once the amount of discrepancy estimated by the discrepancy estimation unit 140b falls within the allowable range and there is no need to move the EVF 14 in this way, the operation instruction unit 140c hides the displayed object for an operation instruction as illustrated in the right part of FIG. 7 and terminates the operation instruction to the user. Further, in a case where the position of the visual field center Co agrees with the position of the target object 212, the position of the corneal center may be used instead of the eyeball position.

An operation instruction process for the device which is conducted by the information processing unit 140 according to the present embodiment has been described above. In the process, a user is visually notified of an operation instruction to move the device and point the line of sight to the visual field center $C_0$ of the display surface 141a when the user's eyeball position is located outside the allowance range of the visual field center $C_0$ of the display surface 141a, which serves as the screen reference position. This allows the user to recognize that the line of sight is divergent from the visual field center $C_0$ of the display surface 141a, and perform an operation for an appropriate state. The user can thus look at a clear image displayed on the EVF 14.

<2. Second Embodiment>

Next, a case will be described as a second embodiment of the present disclosure where the information processing apparatus according to the present disclosure is applied to a glasses-type wearable terminal. The glasses-type wearable terminal is different from the EVF 14 according to the first embodiment in that the glasses-type wearable terminal detects both eyes' lines of sight. The glasses-type wearable terminal can, however, use a method of detecting each eye's line of sight and conduct a process for resolving the discrepancy between the screen reference position and the line-of-sight position in a similar way to that of the first embodiment. The following then chiefly describes the schematic configuration of the glasses-type wearable terminal according to the present embodiment, and an operation instruction process for resolving the discrepancy of the eyeball position in a case where the information processing unit 140 is applied to the glasses-type wearable terminal. The functional configuration of the information processing unit 140 is similar to that of FIG. 4. An operation instruction process conducted by the information processing unit 140 is similar to that of FIG. 5. Accordingly, these will not be described in detail.

[2.1. Apparatus Configuration of Device]

Figure 8:
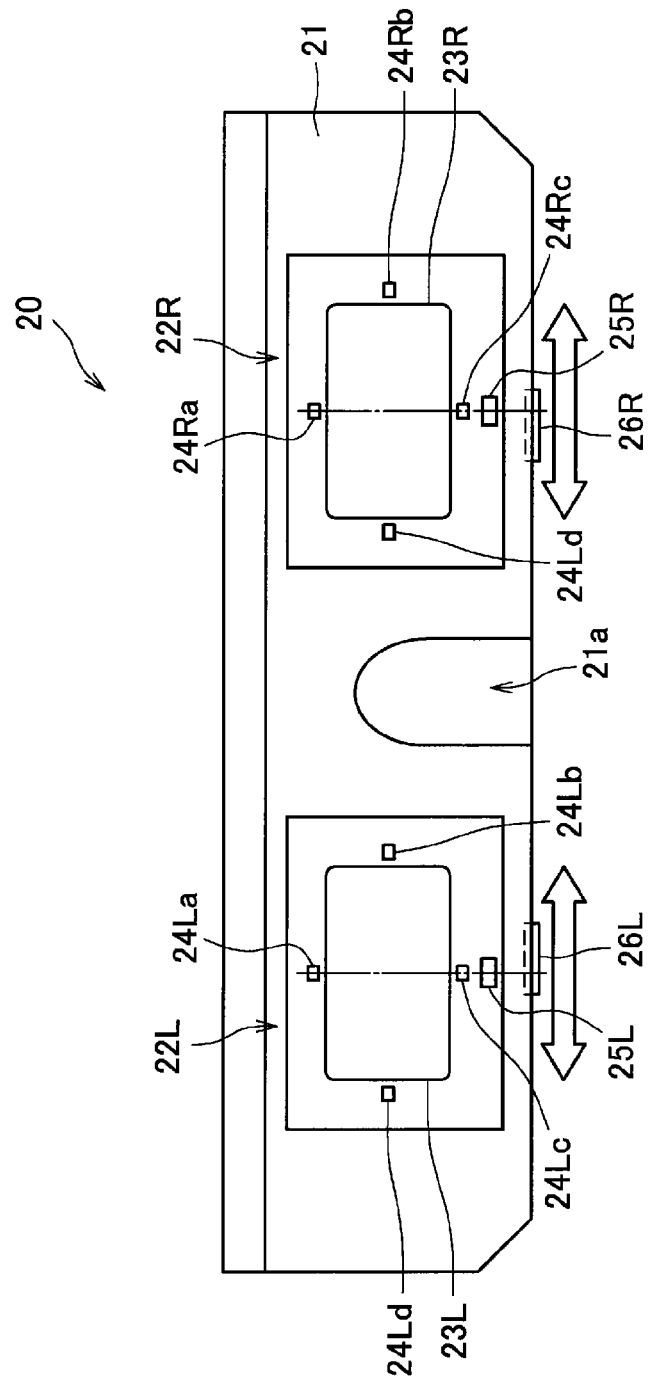
FIG. 8 is a schematic plan view illustrating a schematic configuration of a glasses-type wearable terminal according to a second embodiment of the present disclosure, and illustrates a configuration on a side that faces a face of a user.
Figure 9:
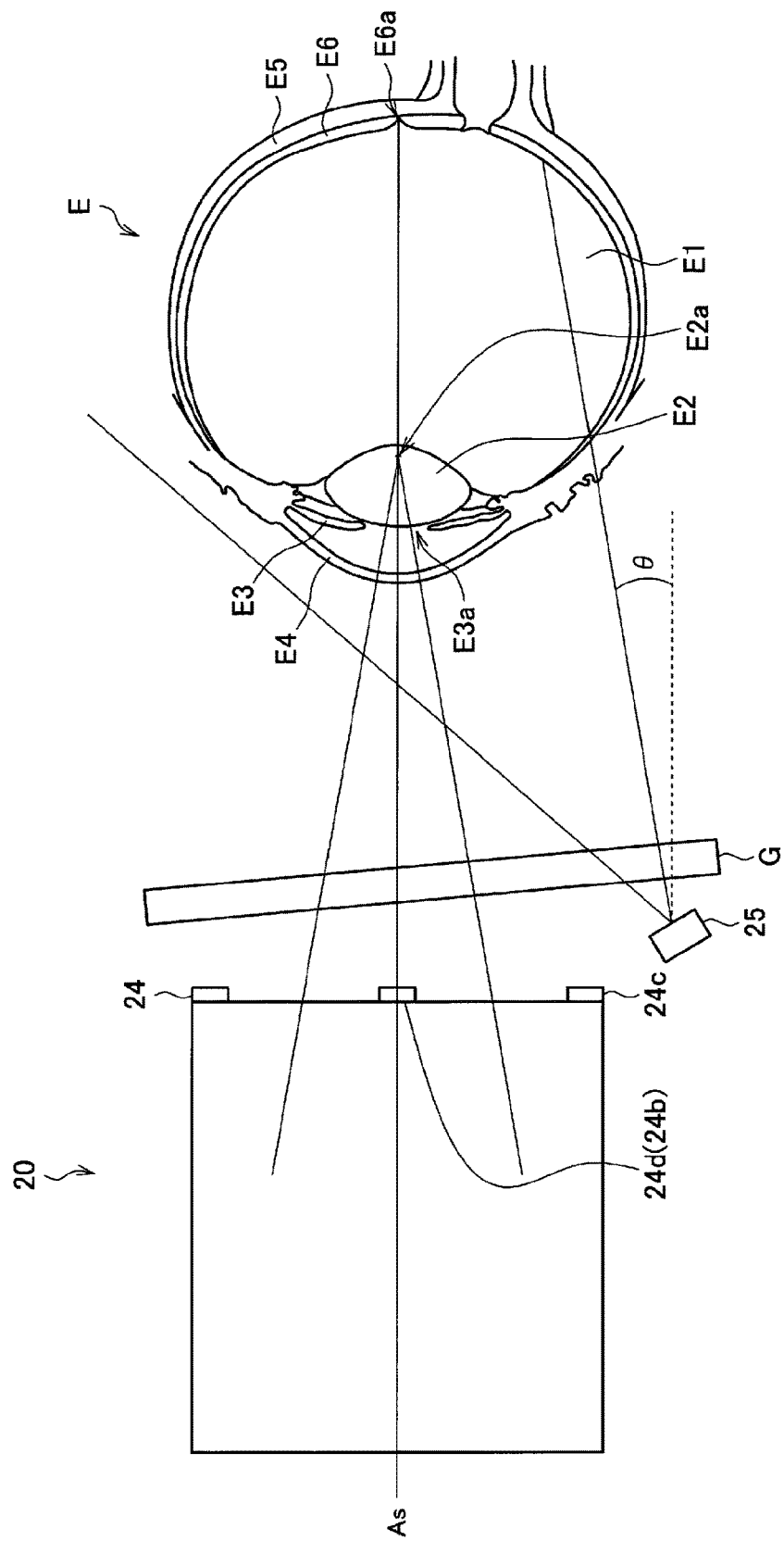
FIG. 9 is a schematic side view illustrating a positional relationship between a user's eyeball and a wearable terminal according to the embodiment when the wearable terminal is worn.

First, the configuration of a glasses-type wearable terminal (which will also be referred to simply as "wearable terminal") 20 to which the information processing apparatus according to the present disclosure is applied will be described on the basis of FIGS. 8 and 9. Additionally, FIG. 8 is a schematic plan view illustrating the schematic configuration of the glasses-type wearable terminal 20 according to the present embodiment, and illustrates the configuration on the side that faces the face of a user. FIG. 9 is a schematic side view illustrating the positional relationship between a user's eyeball E and the wearable terminal 20 according to the present embodiment when the wearable terminal 20 is worn.

The glasses-type wearable terminal 20 is an apparatus which is worn on the user's head, and which is used with the eyes facing one or more display units. Additionally, the glasses-type wearable terminal 20 will be described in the present embodiment, but the information processing apparatus according to the present disclosure can also be applied, for example, to a head-mounted display. The wearable terminal 20 according to the present embodiment is provided with display units 23R and 23L at the positions corresponding to the right eye and the left eye on the planes that face a user's eyes as illustrated in FIG. 8, respectively. The display units 23R and 23L according to the present embodiment are formed in an approximately rectangular shape. Note that on a housing 21, a depression 211a where the user's nose is positioned may also be formed between the display units 23R and 23L.

Around the perimeter of the display unit 23R, four light sources 24Ra, 24Rb, 24Rc, and 24Rd are respectively provided in the approximate middle of the four sides of the display unit 23R. Similarly, around the perimeter of the display unit 23L, four light sources 24La, 24Lb, 24Lc, and 24Ld are respectively provided in the approximate middle of the four sides of the display unit 23L. These light sources 24Ra to 24Rd and 24La to 24Ld are made up of a light source that emits infrared light. The light sources 24Ra to 24Rd and 24La to 24Ld radiate light onto the user's eyeball E that faces the display unit 24R or 24L around which the light sources are respectively provided.

Additionally, around the perimeter of the display units 23R and 23L, imaging unit 25R and 25L that capture an image of the eyeball E are provided, respectively. As illustrated in FIG. 8, for example, each of the imaging units 25R and 25L is provided under each of the display units 23R and 23L (below the light sources 24Rc and 24Lc provided under the display units 23R and 23L). As illustrated in FIG. 9, the imaging units 25R and 25L are disposed so that at least the pupil E3a of the eyeball E to capture is included in the capture range. For example, the imaging units 25R and 25L are disposed having a predetermined elevation angle θ. The elevation angle θ may be set to approximately 30°, for example.

Note that the wearable terminal 20 is configured so that when worn by the user, the display units 23R and 23L are separated from the user's eyeballs E by a predetermined distance. Consequently, the user wearing the wearable terminal 20 is able to keep the display regions of the display units 23R and 23L within his or her field of view without discomfort. At this point, the distance between the display units 23R and 23L and the user's eyeballs E may be decided so that even if the user is wearing glasses the wearable terminal 20 is still wearable over the glasses G In this state, the imaging units 25R and 25L are disposed so that the pupil E3a of the user's eyeball E is included in the capture range.

The wearable terminal 20 according to the present embodiment includes independently movable display detection units 22R and 22L for the left and right eyes as illustrated in FIG. 8, respectively. The display detection units 22R and 22L each include a display unit 23, a light source 24, and an imaging unit 25. The display detection units 22R and 22L can be moved right and left, for example, by slide operation units 26R and 26L provided on the bottom of the housing 21. If the slide operation unit 26R is slid, the display detection unit 22R moves in the sliding direction. If the slide operation unit 26L is slid, the display detection unit 22L moves in the sliding direction. The display detection units 22R and 22L can be independently moved in this way, thereby allowing a user to make an adjustment in a manner that the user can look at the display units 23R and 23L with the interocular distance that matches the user.

[2.2. Operation Instruction Process for Resolving Discrepancy of Line-of-sight Direction]

The wearable terminal 20 according to the present embodiment matches the eyeball positions of a user's right eye and left eye with the visual field centers of the display units 23R and 23L, respectively. This can improve the user's line-of-sight detection accuracy, and allow the user to more clearly look at images displayed on the display units 23R and 23L.

Figure 10:
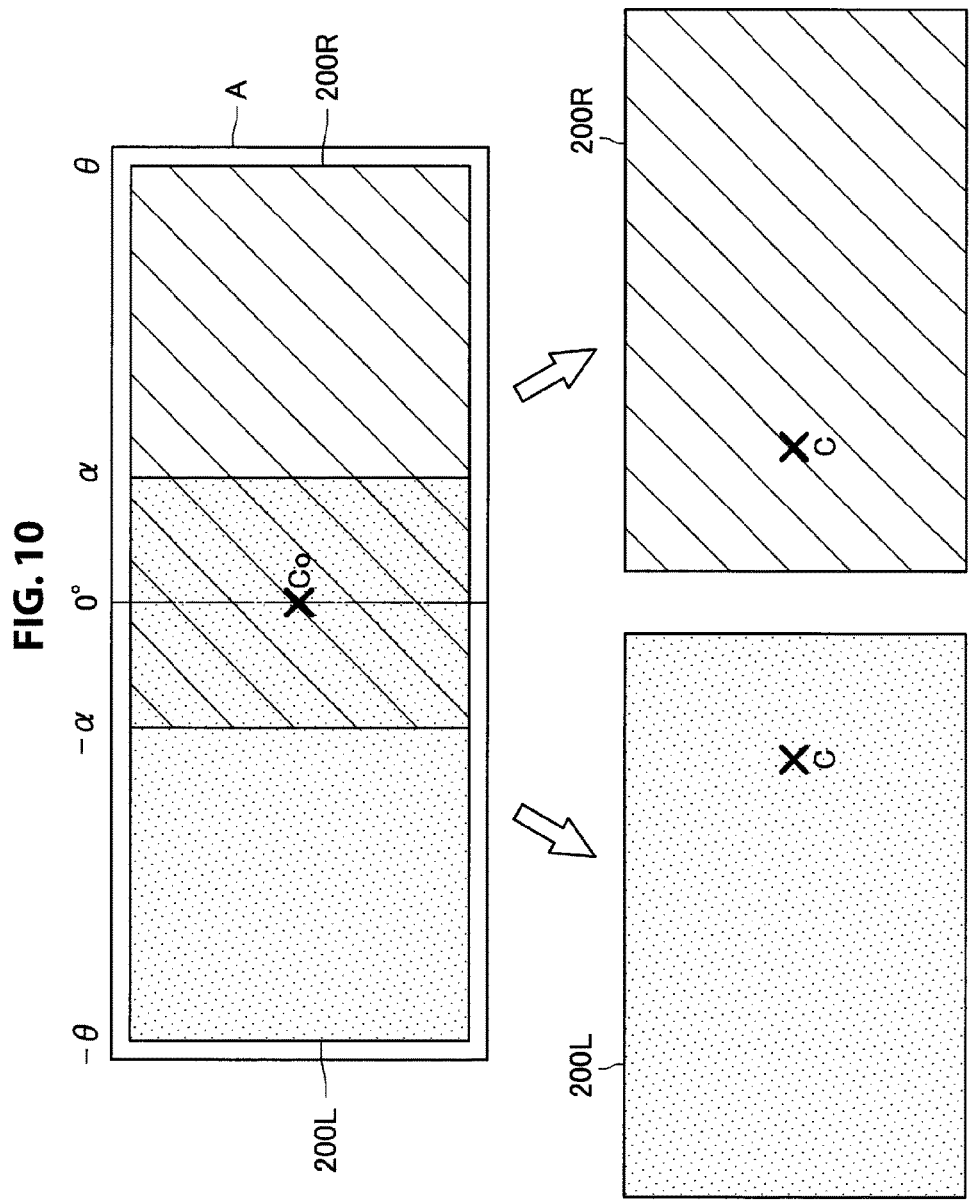
FIG. 10 is an explanatory diagram for describing an image reference position in a case where lines of sight of both eyes are detected.

Here, in a case where both eyes look at images as with the wearable terminal 20 according to the present embodiment, the images at which the user looks include two images. As illustrated in FIG. 10, it is assumed that an entire visual field A of the display units of the wearable terminal 20 has an area of −θ° to θ in the horizontal direction, and the visual field center $C_0$ of the entire visual field A is positioned at the center (i.e., the position of 0°). An image 200R for the right eye then occupies an area of −α° to θ° in the entire visual field A which includes the visual field center $C_0$. An image 200L for the left eye occupies an area of −θ° to α° in the entire visual field A which includes the visual field center $C_0$.

The eyeball position of each eye of the user is then adjusted to agree with the visual field center $C_0$ of the entire visual field A of the corresponding image. In a case where it is determined that the eyeball position of each eye does not match the visual field center of the corresponding display surface, the above-described information processing unit 140 notifies the user of an operation instruction to match the eyeball position with the visual field center $C_0$ of the entire visual field A. The user operates the slide operation units 26R and 26L, moves the wearable terminal 20, or the like in accordance with this operation instruction. This can easily resolve the discrepancy of the line-of-sight direction from the device, and allow the user to more clearly look at information displayed on the display units 23R and 23L.

An example of an operation instruction process for the wearable terminal 20 according to the present embodiment will be described along the flowchart of the operation instruction process for the device which is conducted by the information processing unit 140 illustrated in FIG. 5.

(1) Line-of-sight Position Detection (S100)

The information processing unit 140 first detects the line-of-sight positions of the right eye and the left eye of a user wearing the wearable terminal 20 on the display surfaces of the display units 23R and 23L using the eyeball position estimation unit 140a as illustrated in FIG. 5 (S100). The eyeball position estimation unit 140a uses, for example, the pupil-corneal reflection method to estimate the optical axis that is the line-of-sight direction, thereby detecting the user's eyeball position. The method described in the first embodiment on the basis of FIG. 6 may be used for a process of estimating an optical axis using the pupil-corneal reflection method. The eyeball position estimation unit 140a can identify the user's eyeball positions with the optical axis vectors vo estimated using the pupil-corneal reflection method, and identify the eyeball positions on the display surfaces of the display units 23R and 23L.

(2) Estimation of Amount of Discrepancy (S110)

Once the eyeball position estimation unit 140a identifies a user's eyeball position, the discrepancy estimation unit 140b estimates the discrepancy between the user's estimated eyeball position and a screen reference position (S110). The screen reference position is the visual field center $C_0$ of the entire visual field A in the present embodiment. The screen reference position is set in advance, and stored, for example, in the storage unit 160. The discrepancy estimation unit 140b obtains the coordinate difference between the user's eyeball position on the display surface of each of the display units 23R and 23L and the visual field center $C_0$ of the entire visual field A, and then can obtain the amounts of the discrepancy of the eyeball positions of the right and left eyes from the visual field centers $C_0$ of the entire visual field A.

(3) Determination about Whether Operation is Necessary (S120)

Once the discrepancy between the user's eyeball positions estimated in step S110 and the visual field centers $C_0$ of the display surfaces of the respective display units 23R and 23L is acquired, the discrepancy estimation unit 140b determines whether the amount of the discrepancy falls within the allowable range (S120). The allowable range of the amount of discrepancy is decided, for example, in accordance with whether the line-of-sight detection accuracy based on a captured image taken by the imaging unit 146 falls within an allowable range, or whether the screen can be optically observed with no distortion, and the allowable range of the amount of discrepancy is stored in the storage unit 160 in advance. The discrepancy estimation unit 140b refers to the storage unit 160, and determines whether the amount of discrepancy obtained in step S110 falls within the allowable range. In a case where the discrepancy falls within the allowable range, there is no need to adjust the position of the device. Accordingly, the processes illustrated in FIG. 5 ends. If the wearable terminal 20 is activated, the execution of the processes in FIG. 5 is started again.

(4) Operation Instruction for Device (S130)

Meanwhile, in a case where it is determined in step S120 that the discrepancy does not fall within the allowable range, the user's eyeball is divergent from the visual field center $C_0$ of the display surface of each of the display units 23R and 23L. Accordingly, the operation instruction unit 140c notifies the user of an operation instruction to resolve the discrepancy (S130).

Figure 11:
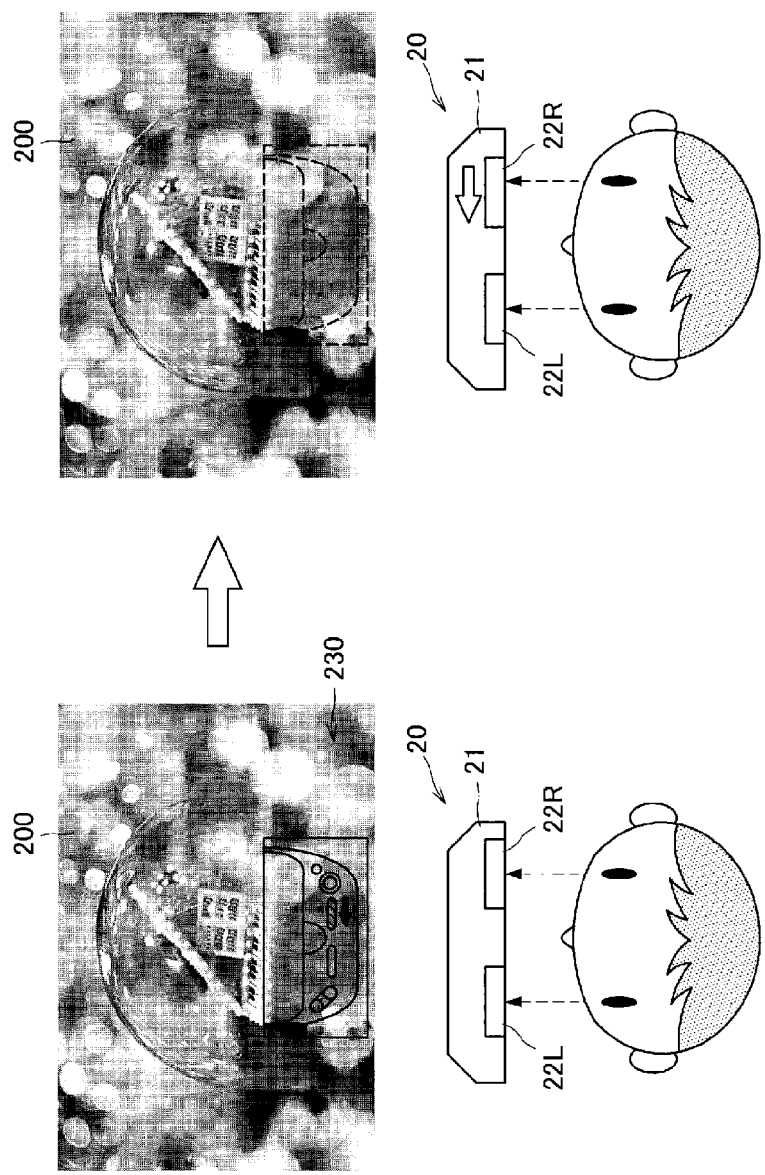
FIG. 11 is an explanatory diagram illustrating an example of an operation instruction from an operation instruction unit according to the embodiment.

FIG. 11 illustrates an example of operation instruction information of which a user is notified when the user's eyeball position is divergent from the visual field center $C_0$ of the display surface. The through-the-lens image 200 illustrated in FIG. 9 is an image displayed on the entire visual field. If the right and left eyes' lines of sight both agree with the visual field centers $C_0$ of the display surfaces when the user face the front, the user can clearly look at this through-the-lens image 200. However, when the eyeball position of any of the right and left eyes does not match the visual field center $C_0$ of the display surface, it is not possible to clearly look at the through-the-lens image 200. In such a case, the operation instruction unit 140c displays an object for imparting an operation instruction to a user as illustrated in the left part of FIG. 11.

For example, the operation instruction unit 140c superimposes a slide instruction object 230 on the through-the-lens image 200 as operation instruction information. The slide instruction object 230 indicates the operation directions of the slide operation units 26R and 26L, which slide the display detection units 22R and 22L right and left. For example, the discrepancy estimation unit 140b estimates the amount of discrepancy, and it is determined as a result that the eyeball position of the right eye is off to the left from the visual field center $C_0$. At this time, as illustrated in FIG. 11, the display unit displays, as the slide instruction object 230, an image describing that the slide operation unit 26R is moved to the left to move the display detection unit 22R of the right eye to the left.

Once the slide instruction object 230 is displayed, the user recognizes that the eyeball position of the right eye is divergent when the user faces the front. The user then moves the slide operation unit 26R to the left. A message object saying "Move the right slide operation unit to the left" may be then superimposed as an operation instruction to the user on the through-the-lens image 200 as illustrated in the left part of FIG. 7. Once the user moves the slide operation unit 26R to the left, and the eyeball position of the right eye agrees with the visual field center $C_0$ of the display surface, the operation instruction unit 140c hides the displayed slide instruction object 230 as illustrated in the right part of FIG. 11, and terminates the operation instruction to the user.

An operation instruction process for the device which is conducted by the information processing unit 140 according to the present embodiment has been described above. In the process, a user is visually notified of an operation instruction to operate the device and locate the eyeball position at the visual field center $C_0$ of the display surface when the user's line of sight is located outside the allowance range of the visual field center $C_0$ of the display surface, which serves as the screen reference position. This allows the user to recognize that the eyeball position is divergent from the visual field center $C_0$ of the display surface, and perform an operation for an appropriate state. The user can thus look at a clear image displayed on the wearable terminal 20.

[2.3. Variation of Operation Instruction Object]

In addition to the above-described slide instruction object 230, the following object may be included in the operation instruction object for resolving the discrepancy of a user's eyeball position from the visual field center of the display surface.

Figure 12:
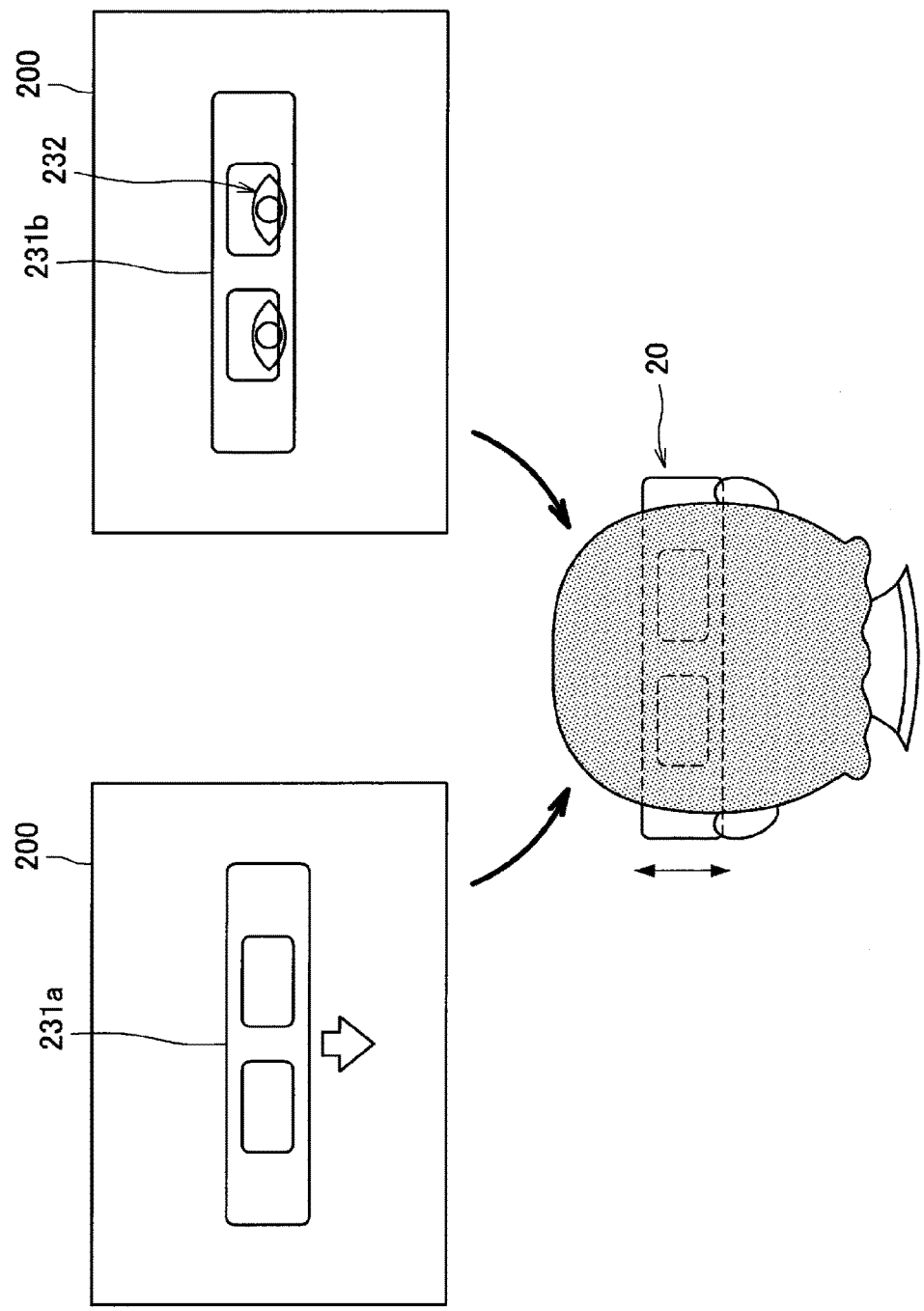
FIG. 12 is an explanatory diagram illustrating an example of an up-down operation instruction object that moves a wearable terminal up and down.

For example, as illustrated in FIG. 12, in a case where a user's right and left eyeball positions are divergent upwardly or downwardly from the visual field centers of the display surfaces, an up-down operation instruction object 231 may be displayed that moves the wearable terminal 20 up and down. For example, as illustrated in the left part of FIG. 12, an up-down operation instruction object 231a may be displayed as the up-down operation instruction object 231. The up-down operation instruction object 231a includes a schematic diagram of the wearable terminal 20, and an arrow indicating the moving direction of the wearable terminal 20. Alternatively, as illustrated in the right part of FIG. 12, the schematic diagram of the wearable terminal 20 may be displayed in the opposite direction to the current eyeball positions as an up-down operation instruction object 231b, and a target object 232 of the right eye and the left eye corresponding to the visual field centers of the display surfaces may be displayed. The user then moves the wearable terminal 20 to match the target object 232 with the display units of the schematic diagram of the wearable terminal 20.

Figure 13:
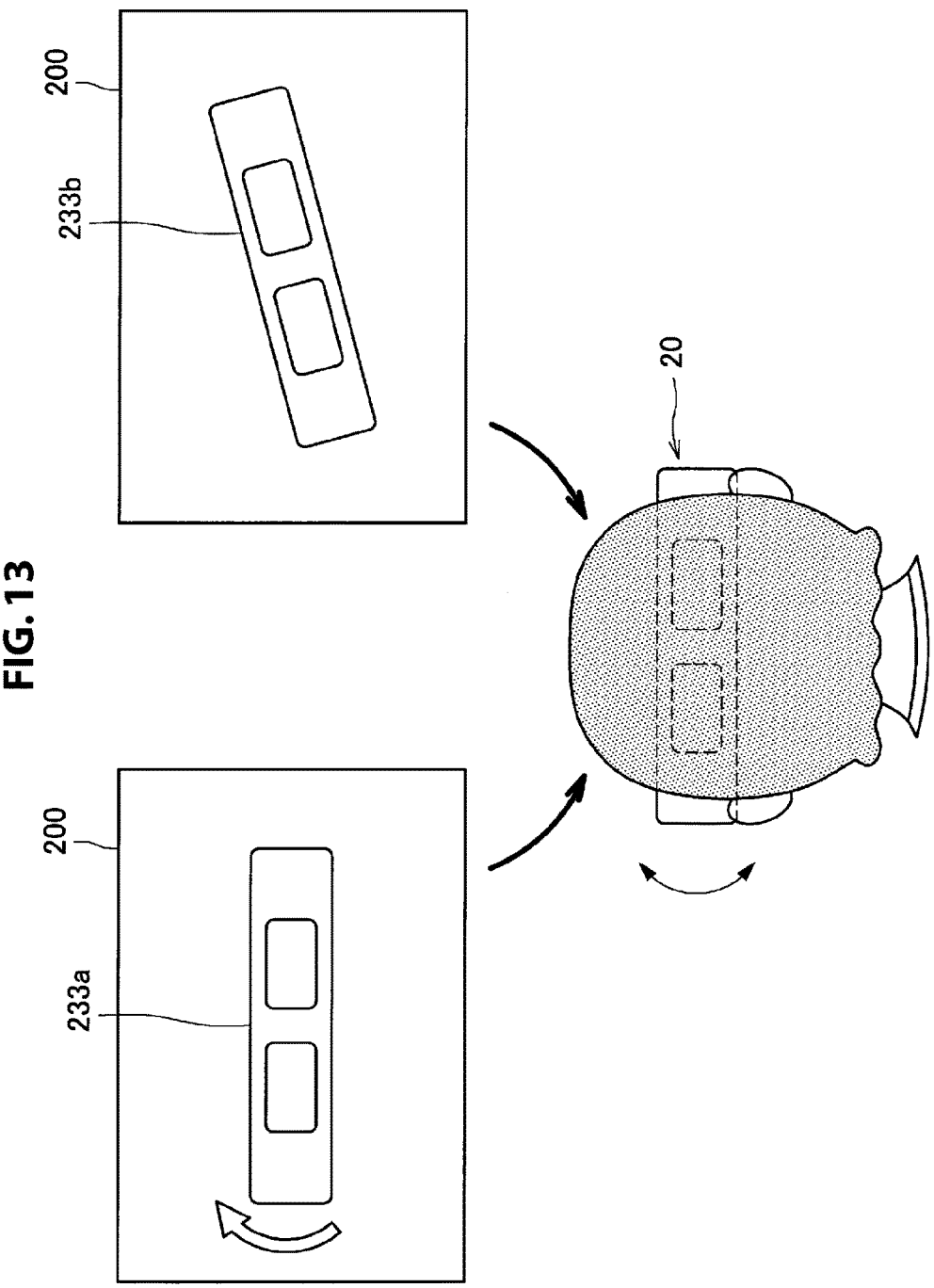
FIG. 13 is an explanatory diagram illustrating an example of a rotation operation instruction object that rotates the wearable terminal.

Further, for example, as illustrated in FIG. 13, in a case where a user's right and left line-of-sight directions are rotated and divergent from the visual field centers of the display surfaces, a rotation operation instruction object 233 may be displayed that rotates the wearable terminal 20 to resolve the inclination. For example, as illustrated in the left part of FIG. 13, a rotation operation instruction object 233a may be displayed as the rotation operation instruction object 233. The rotation operation instruction object 233a includes a schematic diagram of the wearable terminal 20, and an arrow indicating the rotation direction of the wearable terminal 20. Alternatively, as illustrated in the right part of FIG. 13, the schematic diagram of the wearable terminal 20 rotated in response to the current line-of-sight directions may be displayed as a rotation operation instruction object 233b. The user then rotates the wearable terminal 20 to resolve the inclination of the inclined rotation operation instruction object 233b.

Figure 14:
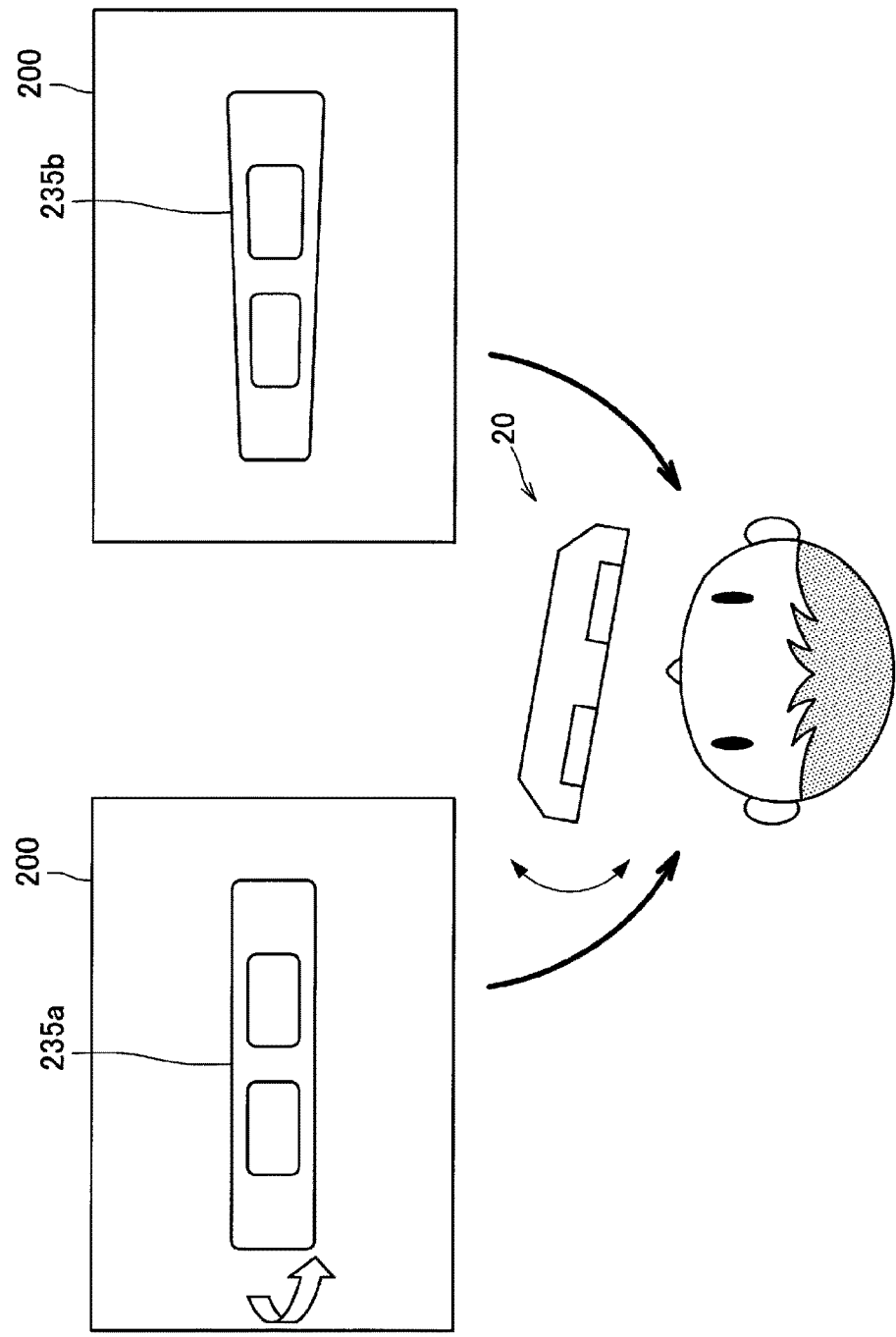
FIG. 14 is an explanatory diagram illustrating an example of an operation instruction object that moves one of right and left sides of the wearable terminal back and forth.

Moreover, for example, as illustrated in FIG. 14, the eyeball of each eye has a different distance from the corresponding display surface of the eye of the wearable terminal 20 in some cases. In this case, the left depth of the wearable terminal 20 is different from the right depth. Accordingly, an operation instruction object 235 may be displayed for resolving this depth discrepancy. For example, as illustrated in the left part of FIG. 14, an operation instruction object 235a may be displayed as the operation instruction object 235. The operation instruction object 235a includes a schematic diagram of the wearable terminal 20, and an arrow indicating the moving direction of the wearable terminal 20. Alternatively, as illustrated in the right part of FIG. 14, the schematic diagram of the wearable terminal 20 which represents the difference in the current depth may be displayed as an operation instruction object 235b. The user then moves the wearable terminal 20 to allow the depth of the operation instruction object 235b to have the same depth.

Further, for example, as illustrated in FIG. 15, the eyeball of each eye is divergent by a preferable distance from the corresponding display surface of the eye of the wearable terminal 20 in some cases. In this case, the left depth of the wearable terminal 20 is equal to the right depth, but it is preferable to put the wearable terminal 20 closer to or farther from the face to adjust the position of the wearable terminal to locate the wearable terminal in the appropriate distance to the eyes. In this case, an operation instruction object 237 may be displayed for resolving the front-back discrepancy of the wearable terminal 20. For example, as illustrated in the left part of FIG. 15, an operation instruction object 237a may be displayed as the operation instruction object 237. The operation instruction object 237a includes a schematic diagram of the wearable terminal 20, and an arrow indicating the moving direction of the wearable terminal 20. Alternatively, as illustrated in the right part of FIG. 15, the schematic diagram of the wearable terminal 20 having the current depth may be displayed as an operation instruction object 237b, and a target object 238 may be displayed at the target position to which the operation instruction object 237b is moved. The user then moves the wearable terminal 20 back and forth to allow the operation instruction object 237b to have the same size as the size of the target object 238.

Additionally, FIGS. 12 to 15 illustrate examples of objects in a case where an operation instruction process conducted by the information processing unit 140 is applied to the wearable terminal 20. However, it is also possible except for FIG. 14 to display a similar object in a case where an operation instruction process conducted by the information processing unit 140 is applied to the EVF 14 described in the first embodiment.

Further, an operation instruction object is not limited to the above-described examples as long as the operation instruction object can visually notify a user of the content of an operation instruction. For example, a specific amount of the discrepancy of the device or a specific amount of the movement of the device may be displayed in the form of text as an operation instruction object.

<3. Hardware Configuration>

Finally, a hardware configuration example of the information processing unit 140 according to the present embodiment will be described. FIG. 16 is a hardware block diagram illustrating a hardware configuration example of the information processing unit 140 according to the present embodiment. Additionally, the above-described embodiment describe that the information processing unit 140 is included in the EVF 14 or the wearable terminal 20. However, for example, if the following information processing apparatus includes the information processing unit 140 and can communicate with the above-described device, it is also possible to execute the above-described operation instruction process.

As described above, the information processing unit 140 according to the embodiments can be implemented as a processing apparatus such as a computer. As illustrated in FIG. 16, the information processing unit 140 includes a central processing unit (CPU) 901, read only memory (ROM) 902, random access memory (RAM) 903, and a host bus 904a. Furthermore, the information processing unit 140 includes a bridge 904, an external bus 904b, an interface 905, an input apparatus 906, an output apparatus 907, a storage apparatus 908, a drive 909, a connection port 911, and a communication apparatus 913.

The CPU 901 functions as an arithmetic processing unit and a controller, and controls the overall operation in the information processing unit 140 in accordance with various programs. Furthermore, the CPU 901 may be a microprocessor. The ROM 902 stores programs, operation parameters, and the like that the CPU 901 uses. The RAM 903 temporarily stores programs used in the execution of the CPU 901 and the parameters and the like that appropriately changes during the execution. The above are interconnected via a host bus 904a constituted by a CPU bus.

The host bus 904a is connected to the external bus 904b, such as a peripheral component interconnect/interface (PCI) bus, through the bridge 904. Note that the host bus 904a, the bridge 904, and the external bus 904b are not necessarily configured as separate components but the functions thereof may be implemented in a single bus.

The input apparatus 906 includes input apparatuses for the user to input information, such as a mouse, a keyboard, a touch panel, a button, a microphone, a switch, and a lever, and an input control circuit that generates an input signal on the basis of the input made by the user and that outputs the input signal to the CPU 901. The output apparatus 907 includes, for example, a display apparatus, such as a liquid crystal display (LCD) apparatus, an organic light emitting diode (OLED) apparatus, or a lamp, and a sound output apparatus such as a speaker.

The storage apparatus 908 is an example of the storage unit of the information processing unit 140 and is an apparatus for storing data. The storage apparatus 908 may include a recording medium, a recording apparatus that records data in the recording medium, a readout apparatus that reads out data from the recording medium, and a deletion apparatus that deletes data recoded in the recording medium. The storage apparatus 908 drives the hard disk and stores therein programs that the CPU 901 executes and various kinds of data.

The drive 909 is a reader/writer for a recording medium and is built-in the information processing unit 140 or is externally attached. The driver 909 reads out information recorded in a magnetic disk, an optical disk, or a magneto-optical disc that is mounted thereto or a removable storage medium such as a semiconductor memory and outputs the information to the RAM 903.

The connection port 911 is an interface connected to an external device and is a port for connecting an external device that is capable of data transmission through, for example, a universal serial bus (USB). Furthermore, the communication apparatus 913 is a communication interface constituted by, for example, a communication apparatus or the like for connecting to a communication network. Furthermore, the communication apparatus 913 may be a communication apparatus corresponding to a local area network (LAN), a communication apparatus corresponding to a wireless USB, or a wired communication apparatus that communicates through wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an eyeball position estimation unit configured to estimate a line-of-sight direction and an eyeball position of a user in a pupil-corneal reflection method on the basis of a captured image including an eye of the user captured when the eye of the user looking at a display surface is irradiated with light;

a discrepancy estimation unit configured to estimate an amount of discrepancy between an eyeball position on the display surface and a visual field center of the display surface, the eyeball position being identified on the basis of the eyeball position; and an operation instruction unit configured to issue an operation instruction to adjust a position of a device including the display surface on the basis of the estimated amount of discrepancy.

(2)

The information processing apparatus according to (1), in which the operation instruction unit displays, on the display surface, an operation instruction object that instructs the user to move the device in a direction in which the amount of discrepancy between the eyeball position on the display surface and the visual field center of the display surface is resolved.

(3)

The information processing apparatus according to (2), in which the operation instruction unit displays, on the display surface, a target object indicating the visual field center of the display surface, and an object indicating the eyeball position on the display surface.

(4)

The information processing apparatus according to any one of (1) to (3), in which the operation instruction unit uses an operation instruction object to notify the user of a method of operating the device to resolve the amount of discrepancy between the eyeball position on the display surface and the visual field center of the display surface.

(5)

The information processing apparatus according to any one of (2) to (4), in which the operation instruction unit hides the operation instruction object displayed on the display surface when the amount of discrepancy between the eyeball position on the display surface and the visual field center of the display surface is less than or equal to a predetermined value.

(6)

The information processing apparatus according to any one of (1) to (5), in which the device is an imaging apparatus to which an electronic view finder is connected.

(7)

The information processing apparatus according to any one of (1) to (5), in which the device is a glasses-type wearable terminal that covers at least fronts of eyes of the user.

(8)

An information processing method including, by an information processing apparatus:

estimating a line-of-sight direction and an eyeball position of a user in a pupil-corneal reflection method on the basis of a captured image including an eye of the user captured when the eye of the user looking at a display surface is irradiated with light;

estimating an amount of discrepancy between an eyeball position on the display surface and a visual field center of the display surface, the eyeball position being identified on the basis of the eyeball position; and issuing an operation instruction to adjust a position of a device including the display surface on the basis of the estimated amount of discrepancy.

(9)

A program for causing a computer to function as:

an eyeball position estimation unit configured to estimate a line-of-sight direction an eyeball position of a user in a pupil-corneal reflection method on the basis of a captured image including an eye of the user captured when the eye of the user looking at a display surface is irradiated with light;

a discrepancy estimation unit configured to estimate an amount of discrepancy between an eyeball position on the display surface and a visual field center of the display surface, the eyeball position being identified on the basis of the line-of-sight direction; and an operation instruction unit configured to issue an operation instruction to adjust a position of a device including the display surface on the basis of the estimated amount of discrepancy.

REFERENCE SIGNS LIST 10 imaging system
12 imaging apparatus
14 electronic view finder (EVF)
20 wearable terminal
22L, 22R display detection unit
23R, 23L display unit
24 light source
25R, 25L imaging unit
26R, 26L slide operation unit
110 light source
120 imaging unit
130 control unit
140 display unit
140 information processing unit
140 estimation unit
140a eyeball position estimation unit
140b estimation unit
140c operation instruction unit
141 display unit
141a display surface
146 imaging unit
212 target object
214 eyeball position object
220 message object
230 slide instruction object
231 up-down operation instruction object
232 target object
233 rotation operation instruction object
235 operation instruction object
237 operation instruction object
238 target object

The invention claimed is:

1. An information processing apparatus, comprising:

an eyeball position estimation unit configured to estimate an eyeball position of a user in a pupil-corneal reflection method on the basis of a captured image including an eye of the user captured when the eye of the user looking at a display surface is irradiated with light;

a discrepancy estimation unit configured to estimate an amount of discrepancy between a line-of-sight position on the display surface and a visual field center of the display surface, the line-of-sight position being identified on the basis of the eyeball position; and an operation instruction unit configured to issue an operation instruction to adjust a position of a device including the display surface on the basis of the estimated amount of discrepancy.

2. The information processing apparatus according to claim 1, wherein the operation instruction unit displays, on the display surface, an operation instruction object that instructs the user to move the device in a direction in which the amount of discrepancy between the eyeball position on the display surface and the visual field center of the display surface is resolved.

3. The information processing apparatus according to claim 2, wherein the operation instruction unit displays, on the display surface, a target object indicating the visual field center of the display surface, and an object indicating the eyeball position on the display surface.

4. The information processing apparatus according to claim 1, wherein the operation instruction unit uses an operation instruction object to notify the user of a method of operating the device to resolve the amount of discrepancy between the eyeball position on the display surface and the visual field center of the display surface.

5. The information processing apparatus according to claim 2, wherein the operation instruction unit hides the operation instruction object displayed on the display surface when the amount of discrepancy between the eyeball position on the display surface and the visual field center of the display surface is less than or equal to a predetermined value.

6. The information processing apparatus according to claim 1, wherein the device is an imaging apparatus to which an electronic view finder is connected.

7. The information processing apparatus according to claim 1, wherein the device is a glasses-type wearable terminal that covers at least fronts of eyes of the user.

8. An information processing method, comprising:

in an information processing apparatus:

estimating an eyeball position of a user in a pupil-corneal reflection method on the basis of a captured image including an eye of the user captured when the eye of the user looking at a display surface is irradiated with light;

estimating an amount of discrepancy between an eyeball position on the display surface and a visual field center of the display surface, the eyeball position being identified on the basis of the eyeball position; and issuing an operation instruction to adjust a position of a device including the display surface on the basis of the estimated amount of discrepancy.

9. A non-transitory computer-readable medium having stored thereon, computer-executable instructions which, when executed by a computer, cause the computer to execute operations, the operations comprising:

estimating an eyeball position of a user in a pupil-corneal reflection method on the basis of a captured image including an eye of the user captured when the eye of the user looking at a display surface is irradiated with light;

estimating an amount of discrepancy between an eyeball position on the display surface and a visual field center of the display surface, the eyeball position being identified on the basis of the eyeball position; and issuing an operation instruction to adjust a position of a device including the display surface on the basis of the estimated amount of discrepancy.

* * * * *